(12) United States Patent
Trulson et al.

(10) Patent No.: US 10,908,405 B2
(45) Date of Patent: Feb. 2, 2021

(54) SYSTEMS AND METHODS FOR COLOR IMAGING

(71) Applicant: Inscopix, Inc., Palo Alto, CA (US)

(72) Inventors: Mark Trulson, San Jose, CA (US); Koen Visscher, Tucson, AZ (US); Kevin E. Newman, Palo Alto, CA (US)

(73) Assignee: INSCOPIX, INC., Palo Alto, CA (US)

(*) Notice: Subject to any disclaimer, the term of this patent is extended or adjusted under 35 U.S.C. 154(b) by 428 days.

(21) Appl. No.: 15/256,296

(22) Filed: Sep. 2, 2016

(65) Prior Publication Data

US 2017/0059841 A1     Mar. 2, 2017

Related U.S. Application Data

(60) Provisional application No. 62/213,551, filed on Sep. 2, 2015.

(51) Int. Cl.
| | |
|---|---|
| G02B 21/18 | (2006.01) |
| G02B 27/00 | (2006.01) |
| G02B 21/02 | (2006.01) |
| G02B 19/00 | (2006.01) |
| G02B 21/24 | (2006.01) |
| G02B 21/36 | (2006.01) |

(52) U.S. Cl.
CPC ......... *G02B 21/18* (2013.01); *G02B 19/0014* (2013.01); *G02B 19/0066* (2013.01); *G02B 21/02* (2013.01); *G02B 21/241* (2013.01); *G02B 21/361* (2013.01); *G02B 21/367* (2013.01); *G02B 27/0037* (2013.01)

(58) Field of Classification Search
CPC ...... G02B 21/18; G02B 21/02; G02B 21/241; G02B 21/361; G02B 21/367; G02B 19/0014; G02B 19/0066; G02B 27/0037

USPC ......................................................... 359/390
See application file for complete search history.

(56) References Cited

U.S. PATENT DOCUMENTS 5,736,410 A     4/1998   Zarling et al.
6,072,622 A *   6/2000   Biber ................. G02B 21/0012
                                                                                 359/368

(Continued)

FOREIGN PATENT DOCUMENTS

CN           1668913 A      9/2005
CN      101116023 A      1/2008

(Continued)

OTHER PUBLICATIONS

Co-pending U.S. Appl. No. 15/403,819, filed Jan. 11, 2017.

(Continued)

*Primary Examiner* — Thomas K Pham
*Assistant Examiner* — Mitchell T Oestreich
(74) *Attorney, Agent, or Firm* — Wilson Sonsini Goodrich & Rosati

(57) ABSTRACT

Provided herein are systems and methods for multi-color imaging using a microscope system. The microscope system can have a relatively small size compared to an average microscope system. The microscope system can comprise various components configured to reduce or eliminate image artifacts such as chromatic aberrations and/or noise from stray light that can occur during multi-color imaging. The components can be configured to reduce or eliminate the image artifacts, and/or noise without substantially changing the size of the microscope system.

16 Claims, 10 Drawing Sheets

(56) References Cited

U.S. PATENT DOCUMENTS

| | | |
|---|---|---|
| 7,511,891 B2 | 3/2009 | Messerschmidt |
| 8,346,346 B1 | 1/2013 | Schnitzer et al. |
| 8,624,967 B2 | 1/2014 | O'Connell et al. |
| 8,696,722 B2 | 4/2014 | Lee et al. |
| 8,788,021 B1 | 7/2014 | Flusberg et al. |
| 9,161,694 B2 | 10/2015 | Schnitzer et al. |
| 9,195,043 B2 | 11/2015 | Ghosh et al. |
| 9,474,448 B2 | 10/2016 | Ghosh et al. |
| 9,498,135 B2 | 11/2016 | Ghosh et al. |
| 9,839,361 B2 | 12/2017 | Schnitzer et al. |
| 10,200,657 B2 | 2/2019 | Ghosh et al. |
| 10,682,197 B2 | 6/2020 | Trulson et al. |
| 2004/0184660 A1 | 9/2004 | Treado et al. |
| 2006/0210962 A1 | 9/2006 | Imaizumi et al. |
| 2007/0109634 A1 | 5/2007 | Araki et al. |
| 2007/0253057 A1 | 11/2007 | Potsaid et al. |
| 2009/0201577 A1 | 8/2009 | Laplante et al. |
| 2011/0127405 A1 | 6/2011 | Grossman et al. |
| 2011/0242649 A1 | 10/2011 | Murayama |
| 2012/0062723 A1 | 3/2012 | Ghosh et al. |
| 2012/0105949 A1* | 5/2012 | Cummings ........ G02B 21/0008 359/385 |
| 2012/0281211 A1 | 11/2012 | Murugkar et al. |
| 2013/0260382 A1 | 10/2013 | Ghosh et al. |
| 2014/0043462 A1 | 2/2014 | Ghosh |
| 2014/0046408 A1 | 2/2014 | Shoham et al. |
| 2015/0057549 A1 | 2/2015 | Flusberg et al. |
| 2015/0087902 A1 | 3/2015 | Mertz et al. |
| 2015/0148615 A1 | 5/2015 | Brennan et al. |
| 2015/0309295 A1 | 10/2015 | Eric et al. |
| 2016/0004063 A1 | 1/2016 | Ghosh et al. |
| 2016/0022148 A1 | 1/2016 | Mark et al. |
| 2016/0183782 A1 | 6/2016 | Yu et al. |
| 2017/0296060 A1 | 10/2017 | Ghosh et al. |
| 2018/0296074 A1 | 10/2018 | Trulson et al. |
| 2018/0303573 A1 | 10/2018 | Trulson et al. |
| 2019/0133449 A1 | 5/2019 | Flusberg et al. |
| 2019/0133453 A1 | 5/2019 | Schnitzer et al. |
| 2019/0356884 A1 | 11/2019 | Ghosh |

FOREIGN PATENT DOCUMENTS

| | | |
|---|---|---|
| CN | 102003936 A | 4/2011 |
| CN | 102540446 A | 7/2012 |
| CN | 103513411 A | 1/2014 |
| JP | 2001183524 A | 7/2001 |
| JP | 2005173487 A | 6/2005 |
| JP | 2005321753 A | 11/2005 |
| JP | 2006154230 A | 6/2006 |
| JP | 2009175486 A | 8/2009 |
| WO | WO-9202839 A1 | 2/1992 |
| WO | WO-2014071390 A1 | 5/2014 |
| WO | WO-2015087824 A1 | 6/2015 |

OTHER PUBLICATIONS

Co-pending U.S. Appl. No. 15/682,326, filed Aug. 21, 2017.
Co-pending U.S. Appl. No. 15/687,166, filed Aug. 25, 2017.
Co-pending U.S. Appl. No. 15/697,702, filed Sep. 7, 2017.
Co-pending U.S. Appl. No. 15/727,317, filed Oct. 6, 2017.
Co-pending U.S. Appl. No. 15/830,894, filed Dec. 4, 2017.
Grintech. High-NA Endomicroscopic Imaging Objective now available as achromatic version. Rev. Dec. 2013. 1 page.
International Search Report and Written Opinion dated Jan. 13, 2017 for International PCT Patent Application No. PCT/US2016/050277.
International Search Report and Written Opinion dated Jan. 19, 2017 for International PCT Patent Application No. PCT/US2016/060717.
Abandoned U.S. Appl. No. 14/213,776, filed Mar. 14, 2014.
Co-pending U.S. Appl. No. 15/331,549, filed Oct. 21, 2016.
Co-pending U.S. Appl. No. 15/344,061, filed Nov. 4, 2016.
Leigh, et al. Multi-color miniature dual-axis confocal microscope for point-of-care pathology. Opt Lett. Jun. 15, 2012;37(12):2430-2. doi: 10.1364/OL.37.002430.
Martin, Paul R. Rheinberg Illumination: A Fresh Approach to High Magnification Color Contrast. Aug. 26, 2014. Available at https://www.mccrone.com/mm/rheinberg-illumination-a-fresh-approach-to-high-magnification-color-contrast.
Pellett, et al. Two-color STED microscopy in living cells. Biomed Opt Express. Aug. 1, 2011;2(8):2364-71. doi: 10.1364/BOE.2.002364. Epub Jul. 22, 2011.
EP16843147.6 European Search Report dated Jun. 17, 2019.
EP16843147.6 European Search Report dated Mar. 8, 2019.
EP16863123.2 Extended European Search Report dated Apr. 25, 2019.
Erdogan, T., Optical filters for wavelength selection in fluorescence instrumentation. Current Protocols in Cytometry, Apr. 1, 2011; pp. 2.4.1-2.4.25.
Murari, et al., An integrated imaging microscope for untethered cortical imaging in freely-moving animals. EIEE in medicine and biology, 2010; 5795-5798.
Murari, et al., Design and characterization of a miniaturized Epi-illuminated microscope. EIEE in medicine and biology, 2009; 5369-5372.
Co-pending U.S. Appl. No. 16/442,750, filed Jun. 17, 2019.
EP16863123.2 European Examination report dated Feb. 20, 2020.
Liu Riu et al., Extendable, miniaturized multi-modal optical imaging system: cortical hemodynamic observation in freely moving animals. Optics Express, Jan. 28, 2013, vol. 21, No. 2, pp. 1911-1924.
U.S. Appl. No. 15/964,832 Office Action dated Feb. 27, 2020.
U.S. Appl. No. 15/964,832 Office Action dated Sep. 9, 2019.
Co-pending U.S. Appl. No. 15/443,999, filed Feb. 27, 2017.
Co-pending U.S. Appl. No. 16/809,991, filed Mar. 5, 2020.
Co-pending U.S. Appl. No. 16/851,678, filed Apr. 17, 2020.
Co-pending U.S. Appl. No. 17/020,978, filed Sep. 15, 2020.

* cited by examiner

SYSTEMS AND METHODS FOR COLOR IMAGING

CROSS-REFERENCE

This application claims the benefit of U.S. Provisional Application No. 62/213,551, filed on Sep. 2, 2015, which disclosure is hereby incorporated by reference in its entirety.

BACKGROUND

Microscopes can be used to image features and objects. In some cases, a microscope can be configured to provide a light source to a sample. The sample can fluoresce in response to the light source provided by the microscope. In some cases, the sample can emit fluorescence within a specified range of wavelengths, the range of wavelengths can correspond to one or more colors in the visible spectrum and/or outside the visible spectrum. Samples that emit different ranges of wavelengths can correspond to different proteins and/or markers.

Multi-color imaging can be used to study different cell population and interactions between the different populations or subsets within a single population. Multi-color imaging can comprise detecting two or more fluorescent emissions from different fluorophores. Multi-color imaging can induce various image artifacts such as chromatic aberrations and/or noise from stray light that need to be corrected in order to obtain a microscopy image that can be used to study different phenomena of interest to a user. In some cases, these image artifacts and noise can be exaggerated in small microscope systems.

SUMMARY

A need exists for a system configured to perform multi-color imaging while minimizing the occurrence of image artifacts such as chromatic aberrations and/or noise from stray light. Furthermore, some image artifacts such as chromatic aberrations and/or noise from stray light can be increased in small microscope systems such that an additional need exists to correct the larger impact of image artifacts and noise in small microscope systems. Provided herein are systems and methods for reducing and/or eliminating the effects of image artifacts such as chromatic aberrations and/or noise from stray light in small multi-color microscope systems. The systems and methods for reducing and/or eliminating the effects of image artifacts and noise can be achieved without substantially increasing the size of the small microscope system. In some cases, the image artifacts such as chromatic aberrations and/or noise from stray light can be reduced and/or eliminated without substantially influencing one or more other performance characteristics of the small microscope system.

Thus, in one aspect, a multi-color microscope system is provided. The system comprises: a first light directing arrangement configured to direct light to a sample; a second light directing arrangement configured to direct light to the sample; a dichroic filter configured to block light in at least two ranges of wavelengths such that light that passes through the dichroic filter (1) does not have a wavelength that overlaps with a wavelength of light that reaches the sample via the first light directing arrangement, and (2) does not have a wavelength that overlaps with a wavelength of light that reaches the sample via the second light directing arrangement, regardless of angle of incidence of light emission from the sample on the dichroic filter; and a detector configured to receive at least two non-overlapping wavelength ranges of the light emission from the sample generated in response to (1) the light directed through the first light directing arrangement, or (2) the light directed through the second light directing arrangement, after the light emission passes through the dichroic filter.

In some embodiments, the microscope system is contained in a housing. In some embodiments, the housing is less than 1 cubic inch in size. In some embodiments, the angle of incidence of light emission from the sample on the dichroic filter varies over a range of at least about 45 degrees. In some embodiments, the first light directing arrangement and the second light directing arrangement provide light to the sample simultaneously. In some embodiments, the first light directing arrangement includes a first light source that produces light. In some embodiments, the second light directing arrangement has a second light source that produces light at a different wavelength than the first light source. In some embodiments, the first light directing arrangement is in optical communication with a light source that is off board the microscope system. In some embodiments, the second light directing arrangement is in optical communication with a light source that is off board the microscope system. In some embodiments, the first light directing arrangement and the second light directing arrangement share at least one common optical element. In some embodiments, the first light directing arrangement and the second light directing arrangement provide light to the sample with are alternately pulsing light pulses. In some embodiments, the detector is a monochrome sensor. In some embodiments, the detector is a multi-color detector comprising one or more color filters. In some embodiments, the system further comprises one or more baffles (1) in an optical path between the sample and the dichroic filter and (2) configured to reduce stray light from being incident on the detector. In some embodiments, the first light direction arrangement and the second light direction arrangement receive light from a single light source configured to produce light in two or more distinct wavelength ranges. In some embodiments, the single light source comprises a plurality of spatially distributed light emitting diodes (LEDs), each LED in the plurality configured to produce light in at least one of the two or more distinct wavelength ranges. In some embodiments, the detector is two or more monochrome sensors that each receive light within their collection wavelength.

In another aspect, a multi-color microscope system is provided. The system comprises: a first light directing arrangement configured to direct light to a sample; a second light directing arrangement configured to direct light to the sample; a detector configured to receive focused light emission from the sample generated in response to (1) the light directed through the first light directing arrangement, or (2) the light directed through the second light directing arrangement, after light emission from the sample is focused through a gradient index (GRIN) lens, wherein the light emission comprises (1) a first range of wavelengths, and (2) a second range of wavelengths that does not overlap with the first range of wavelengths; and a corrective element attached to the GRIN lens and comprising a plurality of raised concentric rings, wherein spacing between the concentric rings is chosen such that at least one of (1) the first range of wavelengths, or (2) the second range of wavelengths experiences a phase shift that focuses (1) the first range of wavelengths and (2) the second range of wavelengths on the same plane on the detector.

In some embodiments, the corrective element comprises a diffractive optical element (DOE). In some embodiments, the corrective element comprises a volume holographic element. In some embodiments, the system further comprises a microscope probe. In some embodiments, the microscope probe is configured to correct chromatic aberration with the corrective element. In some embodiments, the microscope system is contained in a housing. In some embodiments, the housing is less than 1 cubic inch in size. In some embodiments, the first light directing arrangement includes a first light source that produces light. In some embodiments, the second light directing arrangement has a second light source that produces light at a different wavelength than the first light source. In some embodiments, the first light directing arrangement is in optical communication with a light source that is off board the microscope system. In some embodiments, the second light directing arrangement is in optical communication with a light source that is off board the microscope system. In some embodiments, the first light directing arrangement and the second light directing arrangement share at least one common optical element. In some embodiments, the corrective element comprises a negative dispersion refractive lens. In some embodiments, the corrective element comprises a negative dispersion GRIN lens.

In another aspect, a multi-color microscope system is provided. The system comprises: a first light directing arrangement configured to direct light to a sample; a second light directing arrangement configured to direct light to the sample; a detector configured to receive focused light emission from the sample generated in response to (1) the light directed through the first light directing arrangement, and/or (2) the light directed through the second light directing arrangement, wherein the light emission comprises (1) a first range of wavelengths, and (2) a second range of wavelengths that does not overlap with the first range of wavelengths; and a corrective element comprising an adjustable lens, wherein the adjustable lens comprises a variable focal length.

In some embodiments, the system further comprises one or more processors individually or collectively configured to effect adjustment of a focal length of the adjustable lens such that an image captured by the system is in focus for receive focused light emission from the sample generated in response to (1) the light directed through the first light directing arrangement, and (2) the light directed through the second light directing arrangement. In some embodiments, the adjustment of the focal length of the adjustable lens is effected by applying a voltage to the adjustable lens or components associated with the adjustable lens. In some embodiments, the adjustable lens is configured to receive the light emission from the sample after the light emission has been focused by a gradient index (GRIN) lens or other types of objective lenses. In some embodiments, the adjustable lens is configured to receive the light emission from the sample before the light emission passes past a dichroic mirror. In some embodiments, the adjustable lens is a deformable lens. In some embodiments, a focal length of the adjustable lens is adjusted by applying voltage to the adjustable lens or components associated with the adjustable lens. In some embodiments, the adjustable lens is configured to be tilted. In some embodiments, the adjustable lens is configured to be tilted in a radial pattern. In some embodiments, the adjustable lens is configured to be tilted to a differing tilt angle at a rate equal to about an image capture rate of the detector. In some embodiments, the system further comprises one or more processors configured to process a plurality of images, the plurality of images captured with the adjustable lens at a plurality of differing tilt angles, thereby correcting for chromatic aberration of the system. In some embodiments, the adjustable lens is configured to be dithered. In some embodiments, the adjustable lens is configured to dither at a rate equal to about an image capture rate of the detector. In some embodiments, the microscope system is contained in a housing. In some embodiments, the housing is less than 1 cubic inch in size. In some embodiments, the first light directing arrangement includes a first light source that produces light. In some embodiments, the second light directing arrangement has a second light source that produces light at a different wavelength than the first light source. In some embodiments, the first light directing arrangement is in optical communication with a light source that is off board the microscope system. In some embodiments, the second light directing arrangement is in optical communication with a light source that is off board the microscope system. In some embodiments, the first light directing arrangement and the second light directing arrangement share at least one common optical element.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
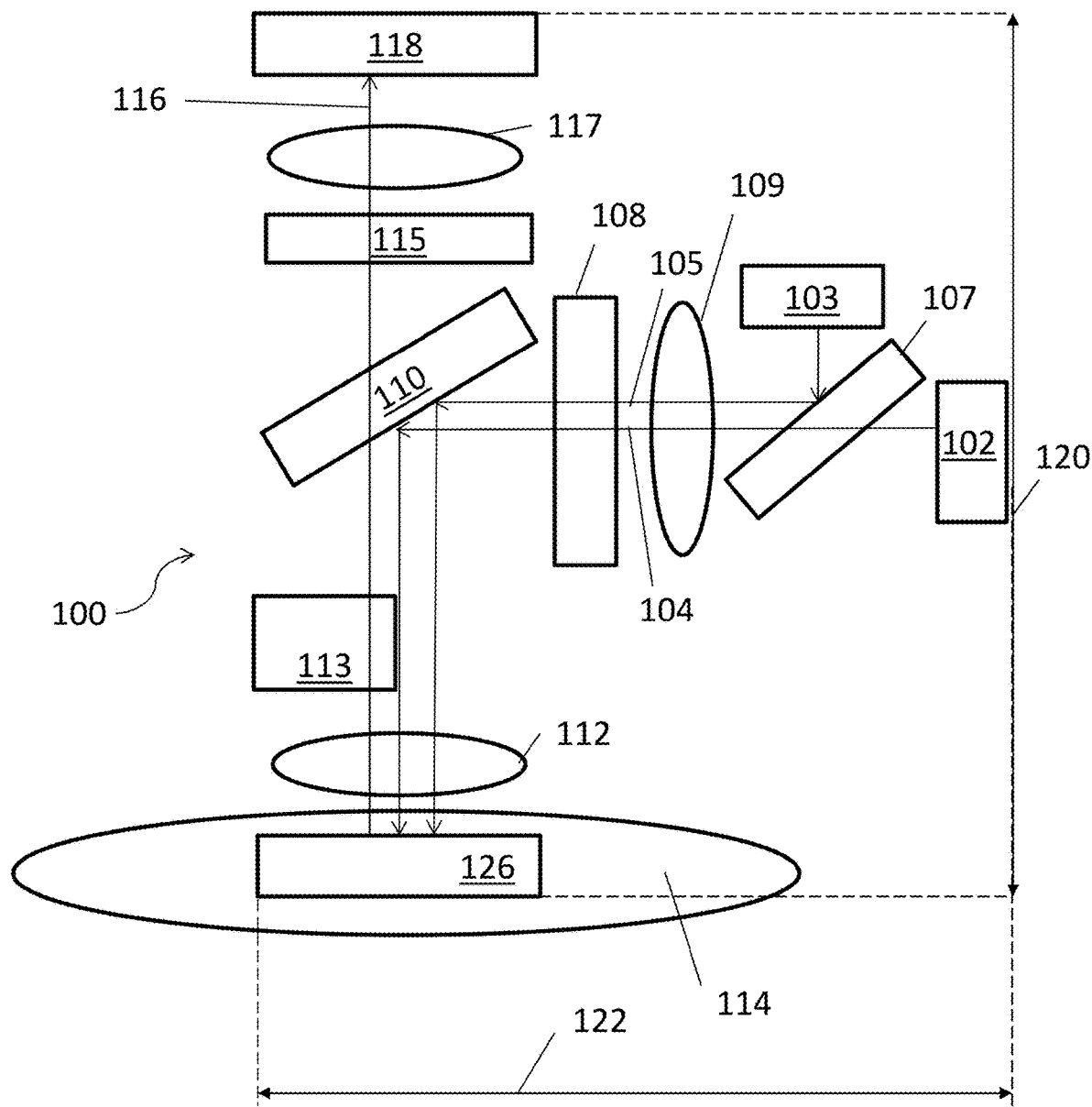
FIG. 1 shows a schematic of a multi-color microscope system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Imaging of light from a sample at different wavelengths using a microscope system can permit a user to study different interactions. The microscope can be configured to magnify one or more features of a sample such that a user can study interactions outside a size range detectable by a user's eyes. The light imaged from the sample at different wavelengths can correspond to different colors that can be imaged in a multi-color microscope imaging process. The microscope system can be configured to measure multiple colors simultaneously. In some cases the microscope can be a relatively small microscope. The microscope can have a maximum dimension less than about 5 inches, 4 inches, 3 inches, 2 inches, 1 inch, or 0.5 inches. The microscope may be mounted onto a living organism or a non-living organism. In some instances, the microscope may be mounted to an exterior of an organism (e.g., over skin of the organism). The microscope may be used to image a sample on or within the organism. For example, the microscope may be mounted to a head of a subject and used to image brain tissue of the organism. The microscope may be mounted to a subject and used to image any other tissue on or within the subject. Examples of samples may include any biological sample or tissue, such as organ tissue, cancerous tissue, vascular tissue, nervous tissue (e.g., brain tissue), muscle tissue, connective tissue, or epithelial tissue. A subject may be a human subject or an animal subject. In some embodiments, animal subjects may include rodents (e.g., mice, rats, rabbits, guinea pigs, gerbils, hamsters), simians, canines, felines, avines, insects, or any other types of animals. In some instances, the subjects may weigh less than about 50 kg, 40 kg, 30 kg, 20 kg, 15 kg, 10 kg, 5 kg, 3 kg, 2 kg, 1 kg, 750 grams, 500 grams, 400 grams, 300 grams, 200 grams, 100 grams, 75 grams, 50 grams, 40 grams, 30 grams, 25 grams, 20 grams, 15 grams, 10 grams, 5 grams, 3 grams, or 1 gram. In some embodiments, the microscope can be inserted into a living organism or a non-living organism. The microscope can be connected to a probe inserted into an organism. The probe may or may not contact a tissue of the organism. The microscope can be used in vivo, or in vitro. In some instances, the microscope may be used in vivo for a subject that is conscious. The microscope may be used in vivo for a subject that is not anesthetized. The microscope may be used in vivo for a subject that may be freely moving or mobile. The subject may be able to freely move around an environment while the microscope is connected to (e.g., mounted on, inserted within) the subject. The subject may be able to freely move around an environment while the microscope is imaging a sample of the subject. A small microscope, such as those having dimensions as described elsewhere herein, may be advantageous to provide little interference with activities of the subjects, or to be used with smaller subjects, such as those having characteristics described herein.

Imaging multiple colors simultaneously can permit a user to image different samples, for example, different cellular populations and interactions between the different cellular populations. The different cellular populations can be stained with a color marker that can be detected by the microscope system. Alternatively, the different cellular populations can naturally emit different color markers that can be detected by the microscope system. In some cases, subpopulations within a population can be identified with multi-color microscopy by detecting a protein, a genetic marker, or other identifiable markers. Differences in the subpopulation can be studied with the multi-color microscope. In some cases, imaging dynamics from one cellular population and hemodynamics can be studied to identify metabolic and/or blood-brain barrier phenomena (e.g., drug delivery).

Different cells can be imaged by tagging the cells with one or more fluorescent proteins. The fluorescent proteins can be fluorophores. In some cases, the fluorophore can be a small-molecule fluorescent indicator such as calcium or other molecular species. In some cases, the fluorophore can be a cell membrane voltage indicator. The fluorescent proteins can emit a detectable emission when excited by a light source provided by the microscope. Different fluorescent proteins can emit light with different wavelengths (e.g., different colors). The different wavelengths can be detected simultaneously by the multi-color microscope.

The multi-color microscope can be any microscope configured to deliver light to a sample and collect an optical emission (e.g., reflected light, excited light, scattered light, or refracted light emission) from the sample. In some cases, the multi-color microscope can be applied to epi-fluorescent imaging applications. While the present disclosure is not necessarily limited to such applications, various aspects of the present disclosure may be appreciated through a discussion of various examples using this context.

In some cases the microscope can be a small microscope. The microscope can have a maximum dimension less than about 5 inches, 4 inches, 3 inches, 2 inches, 1 inch, or 0.5 inches. A maximum dimension of the microscope may be a dimension of the microscope (e.g., length, width, height, diameter) that is greater than the other dimensions of the microscope. The microscope may have a volume of less than or equal to about 10 cubic inches, 7 cubic inches, 5 cubic inches, 4 cubic inches, 3 cubic inches, 2 cubic inches, 1.5 cubic inches, 1 cubic inch, 0.7 cubic inches, 0.5 cubic inches, 0.3 cubic inches, or 0.1 cubic inch. The microscope may have a footprint (e.g., lateral cross section) of less than or equal to about 5 square inches, 4 square inches, 3 square inches, 2 square inches, 1.5 square inches, 1.2 square inches, 1 square inch, 0.9 square inches, 0.8 square inches, 0.7 square inches, 0.6 square inches, 0.5 square inches, 0.3 square inches, or 0.1 square inches. The microscope may have a mass of less than or equal to about 10 grams, 7 grams, 5 grams, 4 grams, 3.5 grams, 3 grams, 2.5 grams, 2 grams, 1.5 grams, 1 gram, 0.5 grams, or 0.1 grams. The small dimensions may be useful for applications where a subject may be small, to provide reduced interference with activities of the subject by the microscope. A small footprint can be useful when the subject is small and/or there is a limited space or area where the microscope may be mounted. The small microscope may be capable of multi-color imaging as described herein. The small microscope may be advantageously configured to provide multi-color imaging within the limited dimensions, as described elsewhere herein. In some cases, the microscope can be used concurrently or sequentially with one or more other diagnostic devices and/or organism manipulation devices such as an implantable probe or cannula. The implantable probe or cannula can permit drug delivery, tissue biopsy, delivery of electrical stimulation or recording of EEG signals, or other stimuli to the sample. The sample can comprise the sample that is being imaged by the microscope. The small size of the microscope can permit the one or more other diagnostic devices and/or organism manipulation devices to be used without spatial interference from the microscope.

The microscope can comprise one or more components configured to reduce and/or eliminate the effects of image artifacts such as chromatic aberrations and/or noise from stray light that can occur during multi-color imaging. The components can be included in the microscope without substantially increasing the size of the small microscope system. In some cases, the image artifacts such as chromatic aberrations and/or noise from stray light can be reduced and/or eliminated without substantially influencing one or more other performance characteristics of the small microscope system.

Consistent with certain example embodiments of the present disclosure, epi-fluorescent imaging can be facilitated through the use of a microscope device and system. For instance, particular aspects of the device and/or system allow the use of ultra-low intensity and/or power levels for excitation light, which are used to generate fluorescence in a target object or cell. Some aspects allow for imaging of a large field of view with a high resolution. Still further aspects are directed toward the high-speed capture of images, which can be viewed in real-time or near real-time. While these points of facilitation are not limiting, they are relevant to a number of different embodiments of the present disclosure.

A particular aspect relates to the proximity between an optical source of excitation light and the target object or cell for imaging. For epi-fluorescent imaging, the interaction between the excitation light and the target object causes the generation of imaging fluorescence. The excitation light is directed toward the target object and has a specific wavelength configured for absorption by fluorophores, fluorescent markers or fluorescent probes. The fluorophores then emit light at different (e.g., longer) wavelengths. Different fluorophores can emit light at different wavelengths (i.e., colors). The different light emissions at different wavelengths can be detected simultaneously by the multi-color microscope. The different light emissions at different wavelengths may occur in response to no separate excitation light source, in response to a single excitation light source, or in response to multiple excitation light sources. The amount of absorbed light is related to the amount of excitation light delivered to the target object. In this manner, the amount of fluorescence generated is correlated to the amount of excitation light. Although various light delivery mechanisms can help reduce the attenuation of light as it travels through a medium, the attenuation of light will increase as distance of travel through a medium increases.

Various fluorescence sources can be used consistent with one or more embodiments discussed herein. The mention of a particular source of fluorescence does not necessarily preclude use of other sources of fluorescence (e.g., genetically-encoded fluorescent proteins, such as GFP, GCaMP, mCherry, and variants thereof). The fluorescence sources can occur naturally in the sample or they can be added to the sample. In some embodiments, any type of luminescence may be detected, including but not limited to photoluminescence (e.g., fluorescence, phosphorescence), chemiluminescence, bioluminescence, or electroluminescence. Multiple colors as a result of reflectance, luminescence, scattering, or other light interactions may be detected.

The microscope system described herein can provide imaging of a target object with a short distance between the target object and the image sensor for capturing image data from multi-color epi-fluorescent light. Image resolution and imaging times can be related to the amount of epi-fluorescent light that can be collected and detected by the image sensor. Attenuation of the epi-fluorescent light due to properties of the optical path between the target object and the image sensor can be undesirable. Attenuation can be reduced by reducing the distance between the target object and the image sensor. Careful design of the microscope device and system allows for placement of the image sensor in close proximity to the target object, thereby facilitating the use of a short optical path within the microscope. Use of filter designs and corrective elements permits multi-color imaging with minimization of image artifacts such as chromatic aberrations and/or noise from stray light without substantially increasing one or more dimensions of the microscope.

In some cases, a distance from an objective lens of a microscope device is set relative to a target object, during imaging of the target object. Large distances between an objective lens and the target object can have a detrimental effect on the amount of the excitation light received at the target object as well as the amount of fluorescence received at and collected by the objective lens. Accordingly, setting the proximity of the object lens relative to the target object (e.g., sample) can be advantageous. A linear distance between a surface of the objective lens and the target object can be at most about 5 cm, 2 cm, 1 cm, 5 mm, 1 mm, 0.1 mm, 0.01 mm, 0.001 mm, 0.0005 mm, or 0.0001 mm.

Embodiments of the present disclosure relate to a microscope device and system that captures image data for a relatively large field of view, the image data providing high resolution of a target object. One such embodiment of the present disclosure includes an image capture circuit, with an array of sensor elements or pixels, which is provided to image the field of view. The sensor elements detect multi-color epi-fluorescence for different portions of the field of view. The sensor elements can be configured with sufficient sensitivity and proximity to the target object to facilitate image capture and generation.

Particular embodiments of the present disclosure relate to the adjustment of excitation light intensity in conjunction with the adjustment of exposure time to improve image quality, image for a particular goal (e.g., image capture rate, resolution, field of view size or imaging depth).

According to other aspects of the present disclosure, relatively low optical magnification is used in connection with high-resolution imaging of a field of view for target objects of small size. The optical magnification can be less than or equal to about 100×, 50×, 10×, 8×, 5×, 4×, 3×, 2×, or 1.5×, 1×, 0.5×, or 0.25×. Constraints on the optical magnification required for a particular level of imaging can be lessened through the careful design and application of a microscope device and system consistent with various aspects discussed herein. In some embodiments, the sensors and optical arrangements may be able to provide a high resolution image that may enable an image of a sample to be digitally zoomed without requiring high optical magnification. One or more of the optical elements in the microscope can be placed a short distance from a sample for imaging. In some cases, a distance between and optical element and a sample for imaging can be at most about 0.0001 mm, 0.001 mm, 0.01 mm, 0.1 mm, 1 mm, 5 mm, 10 mm, 20 mm, 30 mm, 40 mm, 50 mm, 60 mm, 70 mm, 80 mm, 90 mm, or 100 mm. In some cases the distance between and optical element and a sample for imaging can be greater than 100 mm. The distance between an optical element and a sample for imaging can be between any of the values listed herein. Close placement of the one or more optical elements relative to the sample can permit a high resolution image to be captured without high magnification requirements. In some cases high optical magnification can require a large imaging distance. High optical magnification may not be achievable within the dimensions of the microscope described elsewhere herein. High optical magnification can require an imaging distance that is longer than the longest dimension of the microscope described herein. Larger systems that permit high optical magnification may prevent an organism from freely moving during imaging of one or more tissues and/or features of the organism.

Embodiments of the present disclosure relate to the real-time imaging of target objects using a microscope device and/or system consistent with aspects discussed herein. In certain of these embodiments, the imaging rate is increased by reducing the field of view while holding a constant resolution, the image capture time is reduced by reducing the exposure time and/or the frame rate achievable for such real-time imaging is correlated to size of the full field of view as well as the desired image resolution. Another factor optionally implemented therewith includes the type and responsiveness of the image sensor that is used. Still other factors relate to the ability to transmit and process the image data for display, should it be desirable to view the images in real-time.

Still other embodiments of the present disclosure relate to the facilitation of in vivo or in vitro epi-fluorescent imaging. For instance, in vivo imaging of a live subject can be particularly useful for correlating external stimuli and other factors with the captured images. This correlation can be used, for example, as a diagnostic/research tool by associating properties of the captured images with the external stimuli. In some cases, the effects of a local stimulus such as drug delivery or electrical stimulation can be visualized using imaging methods described herein. Real-time imaging at high frame rates can further provide visualization of the effects to a local or external stimulus as a function of time.

An embodiment of the present disclosure is directed toward a multi-color microscope device and/or system having a modular design that facilitates detaching and reattaching various components of the microscope device. The detachment and reattachment can be used to replace the modular components with new and/or different modular components. For instance, the light source can be replaced with a new light source having the same or different optical and electrical properties. In some cases, a light source emitting light with a different wavelength or range of wavelengths can be chosen and reattached. A multi-headed light source can be employed in the microscope. The multi-headed light source can comprise two or more light sources. The two or more light sources can emit light with a different wavelengths or ranges of wavelengths. The optical direction elements (e.g., mirrors, filters and lenses) can also be removed and replaced. In some cases, a first set of optical direction elements can be replaced with a second set of optical direction elements when the second set of optical direction elements is better configured to detect colors in the wavelengths of interest for imaging by a user. For example, the optical direction elements can have performance metrics that are dependent on wavelength of incident light such that detection of colors in a certain range of wavelengths can result in a better (e.g., less noisy, higher resolution) image when using a specific set of optical direction elements.

In certain other embodiments consistent with the instant disclosure, one or more of the imaging devices includes a synchronization circuit for interfacing to an external optical-data processing (recording and/or configuring) system. The synchronization circuit includes logic circuitry (e.g., a programmable or semi-programmable chip like a microcontroller or ASIC) that is configured and arranged to communicate a frame reference/active signal. In a typical application, a frame active signal would provide synchronization information, e.g., as defined in an IEEE communications standard, for and with the data communicated between the imaging device and the external system. Such an optical-data recording/configuring system can be used to install software, configure set-up parameters for experiments and procedures, provide visual feedback during such experiments and procedures, and record the optical data for manipulation and further study.

In yet further embodiments, the instant disclosure is directed to methods of using the image devices which are described herein. In some cases, the microscope can comprise a base plate acting as a foundational structure which provides support/stability and also allows for microscope (re)alignment. These methods include the steps of attaching and reattaching the epi-fluorescence microscope to the base plate for allowing the microscope alignment to be precise. Such precision should be sufficient for repeated imaging of a common imaging location, e.g., during chronic experiments.

Turning now to the figures, FIG. 1 depicts a block diagram of a multi-color microscope device, consistent with an embodiment of the present disclosure. In some embodiments, the multi-color microscope may be an epi-fluorescence microscope. The microscope device 100 may include a number of components within the dimensions 120 and 122. Not shown is a further dimension, which extends perpendicular to the dimensions 120 and 122. Although not necessarily limited thereto, each of these dimensions can be less than an inch. In some cases, dimension 120 can be at most about 0.001 inch, 0.01 inch, 0.05 inch, 0.1 inch, 0.2 inch, 0.3 inch, 0.4 inch, 0.5 inch, 0.6 inch, 0.7 inch, 0.8 inch, 0.9 inch, 1 inch, 1.5 inches, 2 inches, or 5 inches. In some cases, dimension 122 can be at most about 0.001 inch, 0.01 inch, 0.05 inch, 0.1 inch, 0.2 inch, 0.3 inch, 0.4 inch, 0.5 inch, 0.6 inch, 0.7 inch, 0.8 inch, 0.9 inch, 1 inch, 1.5 inches, 2 inches or 5 inches. In some cases the dimension extending perpendicular to the dimensions 120 and 122 can be at most about 0.001 inch, 0.01 inch, 0.05 inch, 0.1 inch, 0.2 inch, 0.3 inch, 0.4 inch, 0.5 inch, 0.6 inch, 0.7 inch, 0.8 inch, 0.9 inch, 1 inch, 1.5 inches, 2 inches, or 5 inches.

The epi-fluorescence microscope device 100 can include a first optical arrangement 102. The first optical arrangement 102 can generate excitation light 104. The first optical arrangement can include a first light source that produces light. In a particular implementation, the first light source can be a light-emitting-diode (LED) or an organic light-emitting-diode (OLED). The first light source can be a laser diode or a superluminescent diode. The first optical arrangement can be in communication with an off board light transmission element that transmits light from a first light source off-board the microscope to the first optical arrangement. The light transmission element can be a fiber optic element. The first light source can comprise an array of light sources, for example a micro LED array. In some cases, the light source can comprise two or more optical sources configured to emit light at different wavelengths. The two or more optical sources can be arranged in a matrix or an array. Two or more light sources can emit light in two different ranges of wavelengths. Light emitted from a first light source can have a first range of wavelengths. Light emitted from a second light source can have a second range of wavelengths. The first range of wavelengths and the second range of wavelengths may not overlap. The first range of wavelengths and the second range of wavelengths may overlap. The two or more optical sources can emit light simultaneously. Alternatively, the two or more light sources can be pulsed such that only one light source emits light at a time.

In some cases, the microscope device 100 can include a second optical arrangement 103. The microscope may not include a second optical arrangement. The first optical arrangement and the second optical arrangement can be arranged perpendicular to each other. The first optical arrangement and the second optical arrangement can have at least one optical element in common. The first optical arrangement and the second optical arrangement can have at least one shared optical element. The second optical arrangement can have a second light source that can generate excitation light 105. The second light source can be a light-emitting-diode (LED) or an organic light-emitting-diode (OLED). The second light source can be a laser diode or a superluminescent diode. The second optical arrangement can be in optical communication with a second light source through a light transmission element that transmits light from a light source off-board the microscope to the second optical arrangement. The light transmission element can be a fiber optic element. The second light source can comprise an array of light sources, for example a micro LED array. Light emitted from the first light source can have a first range of wavelengths. Light emitted from the second light source can have a second range of wavelengths. The first range of wavelengths and the second range of wavelengths may not overlap. The first range of wavelengths and the second range of wavelengths may overlap.

In some cases, the first light direction arrangement and the second light direction arrangement receive light from a single light source configured to produce light in two or more distinct wavelength ranges. The single light source can be on-board either or both of the first and second light direction arrangements. The single light source can be within a housing of either or both of the first and second light direction arrangements. The single light source can be off-board either or both of the first and second light direction arrangements. The single light source comprises a plurality of spatially distributed light sources. The single light source comprises a plurality of spatially distributed light emitting diodes (LEDs), each LED in the plurality configured to produce light in at least one of the two or more distinct wavelength ranges.

A light source combining element 107 can be provided to optically combine light from the first light source with light from the second light source. The light source combining element can be a dichroic filter. The dichroic filter can collect light from the first light source and light from the second light source and combine the light in a single optical path.

Combined light from the first light source and the second light source can pass through a condenser lens 109. The condenser lens can collect and concentrate light from the first light source and the second light source.

In some cases, both the first light source and the second light source can be turned on (e.g., emit light) at the same time. Light from the first light source and the second light source can pass through an excitation filter 108. The excitation filter can be a short pass filter. The excitation filter can be a band pass filter. In some cases, the excitation filter can permit transmission of light in a predetermined range of wavelengths. The predetermined range of wavelengths can be a subset of wavelengths generated by the first light source or the second light source. The excitation filter can effectively permit transmission of light from only the first or only the second light source. In some cases, the excitation filter 108 can be omitted from the optical path such that light from the first light source and the second light source can be delivered to the sample without spectral filtering.

The excitation light (e.g., combined light emission from the first light source and the second light source) 104, 105 can be directed by an optical arrangement to a target object 114, for imaging thereof. The optical arrangement can include one or more of the light source combining element 107, the condenser lens 109, the excitation filter 108, objective lens 112, (dichroic beam splitter) mirror 110, an emission filter 115, and a tube lens 117. Epi-fluorescent light 116 from the target object 114 is directed from/by the objective lens to an image capture circuit 118. The image capture circuit can comprise one or more monochrome sensors. In some cases, light from the sample within a predetermined wavelength range can be directed to each of the one or more monochrome sensors. The predetermined wavelength range can be a collection wavelength range of each of the monochrome sensors. Each monochrome sensor can have light within its collection wavelength directed to it. The image capture circuit can comprise one or more color sensors. The microscope device 100 may be configured to direct light from and capture image data for a field of view 126.

In various embodiments of the present disclosure, the microscope device 100 can also include one or more of an image-focusing optical element (e.g., an achromatic lens) and an emission filter. These and other elements can help control optical properties of the microscope device 100.

Consistent with one embodiment, the depicted elements are each integrated into a relatively small area, e.g., within a single housing having dimensions 120, 122. The total volume of the housing can be at most about 5 in$^3$, 3 in$^3$, 1 in$^3$, 0.75 in$^3$, 0.5 in$^3$, 0.25 in$^3$, or 0.1 in$^3$. The housing may be formed from a single part or multiple pieces. The housing may partially or completely enclose one or more of the components described herein. The housing may be optically opaque and may prevent light from outside the microscope from entering the microscope. In some instances, light may only enter the interior of the microscope through the objective lens.

Such integration of the various components can be particularly useful for reducing the length the optical pathway from one or more the light sources to the target object 114 and back to the image capture circuit 118. The reduction of this optical pathway can be part of the configuration parameters that facilitate a number of different properties and capabilities of the microscope device 100. For example, in certain embodiments the microscope can provide images with a resolution to 1 um for an imaging field of view with an area of at least about 0.01 mm$^2$, 0.05 mm$^2$, 0.1 mm$^2$, 0.5 mm$^2$, 1 mm$^2$, 2 mm$^2$, 3 mm$^2$, 4 mm$^2$, or 5 mm$^2$.

In some cases, a light detector such as a color sensor can be provided in the image capture circuit. The color sensor can be configured to sense emitted light in two or more distinct wavelength ranges. The color sensor can comprise a color filter array such that a detection surface of the color sensor can detect light emissions in a predetermined wavelength range. In some cases, the color filter array can comprise three filter types with each of the three filter types able to permit transmission of light in a predetermined wavelength range. Alternatively the filter array can comprise more than three filter types, less than three filter types, or three filter types. The color sensor can have a color filter array. The color sensor can have a color filter array arranged in a Bayer pattern. In some cases, use of the color sensor can result in reduced sensitivity and/or resolution because each pixel in the color sensor receives only a fraction of the total light incident on the sensor as a result of the color filter array. The microscope described herein has a short optical path between the sample and the sensor such that the amount of light incident on the sensor is maximized.

The light detector can comprise one or more monochromatic sensors which can be provided in the image capture circuit. The monochromatic sensor can be configured to detect light in a predetermined wavelength range. The monochromatic sensor can detect light in a wavelength range that is larger than the wavelength range that is transmitted to a fraction of the color sensor by one of the filters in the color sensor filter array. Because the monochromatic sensor detects light in a wider range of wavelengths compared to any fraction of the color sensor, the monochromatic sensor can detect comparatively more light which can result in a higher quality image and greater detection sensitivity by the monochromatic sensor. All pixels within the monochromatic sensor may be used to collect light. Because all pixels within the monochromatic sensor may be used to collect light, the monochromatic sensor may have great detection sensitivity and may be used to obtain a high resolution image. Because all pixels within the monochromatic sensor may be used to collect light, the monochromatic sensor may have greater detection sensitivity and may be used to obtain a higher resolution image (e.g., compared to an image sensor using a color filter in which a subset of the pixels is used to collect light).

The monochromatic sensor may not be able to distinguish between light in a first wavelength range (e.g., color) and a second wavelength range (e.g., color) when the first wavelength range and the second wavelength range are both encompassed by the range of wavelengths detected by the monochromatic filter. In order to achieve multicolor imaging with the monochromatic filter temporal and/or spectral multiplexing can be performed. In temporal multiplexing the first light source and the second light source can be pulsed in an alternating pattern such that emission from the sample caused by excitation from the first light source and emission from the sample caused by excitation from the second light source can be temporally separated. A pulse duration of the first light source and a pulse duration of the second light source can be the same. In some cases, the pulse duration of the first light source can be longer than the pulse duration of the second light source. Alternatively, the pulse duration of the first light source can be shorter than the pulse duration of the second light source. In some cases, the first light source and the second light source can be pulsed in an alternating pattern at a rate of about 5 Hz, 10 Hz, 20 Hz, 30 Hz, 40 Hz, 50 Hz, 60 Hz, 70 Hz, 80 Hz, 90 Hz, 100 Hz, 5000 Hz, 1000 Hz, 10000 Hz, 100000 Hz, or 1000000 Hz. Alternatively the first light source and the second light source can be pulsed in a pattern that is different from an alternating pattern such that either or both of the first and second light sources are pulsed consecutively two or more times before a pulse from the opposite light source. In some cases, the first light source and/or the second light source can be pulsed at a rate that is slower than 5 Hz. In some cases the first light source and/or the second light source can be pulsed at a rate that is faster than 1000000 Hz. The first and/or second light sources can be pulsed at a rate between any of the values listed herein.

A particular example embodiment is configured with an array of optical sensors 118. An optical arrangement can be configured to direct excitation light 104, 105 of less than about 1 mW (various embodiments provide for a higher excitation power, e.g., 100 mW) to a target object 114 in a field of view 126 of that is at least 0.5 mm$^2$ and to direct epi-fluorescence emission 116 caused by the excitation light 104, 105 to the array of optical sensors 118. In various embodiments, the field of view 126 can be at least 1 mm$^2$. The optical arrangement and array of optical sensors 118 each configured sufficiently close to the target object 114 to provide at least 2.5 µm resolution for an image of the field of view 126. In other embodiments, the optical arrangement and array of optical sensors 118 can be configured to provide at least 1 µm resolution. In certain embodiments, the excitation optical power at the specimen is variable and can be in the range of 100 µW-100 mW, depending upon the particular configuration and imaging constraints.

Consistent with an embodiment of the present disclosure, the first light source and/or the second light source can deliver light of up to 6 mW. It is not, however, necessarily a requirement that the first light source and/or the second light source can provide light of such intensity. Moreover, the amount of light received by the target object is less than (relative to an attenuation factor) the amount of light provided by the first light source and/or the second light source can. For instance, the attenuation of one embodiment results in 6 mW at the light source corresponding to 1 mW excitation power delivered at the target object. Similarly, to deliver 100 mW of excitation power at the specimen the light source can be configured to provide up to 600 mW.

The microscope system can additionally comprise one or more optical elements (e.g., filters) 113 configured to prevent or reduce chromatic aberrations. The optical element configured to minimize and/or eliminate the chromatic aberrations can comprise a diffractive optical element (DOE). In some cases, the optical element configured to minimize and/or eliminate the chromatic aberrations can comprise a doublet lens with a negative optical element. In some cases, the optical element configured to chromatic aberrations can comprise a doublet lens with negative optical element formed from highly dispersive glass and a positive element formed from low dispersion glass. In some cases, the optical element configured to minimize and/or eliminate the chromatic aberrations can comprise a negative dispersion refractive lens. In some cases, the optical element configured to minimize and/or eliminate the chromatic aberrations can comprise a negative dispersion gradient refractive index (GRIN) lens.

During multi-color imaging light can be incident on the dichroic filter 110 element from a wide variety of angles. The dichroic filter can be a multilayer optical device configured to transmit light within a predetermined range or ranges of wavelengths. The dichroic filter can be configured to reflect light within a predetermined range or ranges of wavelengths. In some cases, light can be incident on the dichroic filter (e.g., dichroic beam splitter) within an angular range of about +/−10 degrees relative to a preferred angle of incidence. The angular range of incident angle can be large relative to an angular range expected in a relatively larger multi-color imaging system. An expected angular range of incident angle for a relatively larger multi-color imaging system can be on the order of about +/−1 degree relative to a preferred angle of incidence. The spectral range of light transmitted through the dichroic filter can be dependent on the incident angle of the light. In some cases, the relatively large angular range of the light incident on the dichroic filter can cause unwanted light (e.g., light outside of a desired wavelength range) to be transmitted through the dichroic filter. The unwanted light can cause glare and/or noise in an image produced by the microscope. In some cases, noise can be generated by increased background levels of light and/or spatial light artifacts. The unwanted light can cause glare on the edges of the image.

The dichroic filter can be designed such that the dichroic filter operates with transmittance passbands that do not overlap with the passbands of the excitation light from the first light source and/or the excitation light from the second light source. The dichroic filter can prevent excitation light from the first light source and/or the excitation light from the second light source from reaching the image capture circuit. The dichroic filter can be designed with one or more dead bands within which neither the excitation nor emission filters transmit light. The dichroic filter can be designed such that the dichroic filter operates with transmittance passbands that do not overlap with the passbands of the excitation light from the first light source and/or the excitation light from the second light source regardless of the angle of the light incident on the dichroic filter. The dichroic filter can be designed such that the dichroic filter operates with transmittance passbands that do not overlap with the passbands of the excitation light from the first light source and/or the excitation light from the second light source over a range of angles of the light incident on the dichroic filter of at least about 90°. The dichroic filter can be designed such that the dichroic filter operates with transmittance passbands that do not overlap with the passbands of the excitation light from the first light source and/or the excitation light from the second light source over a range of angles of the light incident on the dichroic filter of at least about 45°. The dichroic filter can be designed such that the dichroic filter operates with transmittance passbands that do not overlap with the passbands of the excitation light from the first light source and/or the excitation light from the second light source over a range of angles of the light incident on the dichroic filter of at least about 30°. The dichroic filter can be designed such that the amount of light power from the first light source and/or the second light source that can be transmitted through the dichroic filter is at least about 0.001, 0.005, 0.01, 0.02, 0.03, 0.04, 0.05, 0.06, 0.07, 0.08, 0.09, or 0.1 times the power of the first light source and/or the second light source. The dichroic filter can be designed such that the amount of light power from the first light source and/or the second light source that can be transmitted through the dichroic filter is at most about 0.001, 0.005, 0.01, 0.02, 0.03, 0.04, 0.05, 0.06, 0.07, 0.08, 0.09, or 0.1 times the power of the first light source and/or the second light source. In some cases, the amount of light power from the first light source and/or the second light source that can be transmitted through the dichroic filter can be greater than 0.1 times the power of the first light source and/or the second light source. The amount of light power from the first light source and/or the second light source that can be transmitted through the dichroic filter can be between any of the values listed herein.

The dead bands of the dichroic filter can be designed such that they prevent transmission of the excitation light from the first light source and/or the excitation light from the second light source. The dead bands of the dichroic filter can be designed such that they do not overlap with at least a portion of a wavelength range of one or more fluorophore emissions. The dichroic filter can be used in combination with baffles or other physical barriers designed to block unwanted light.

Figure 2A:
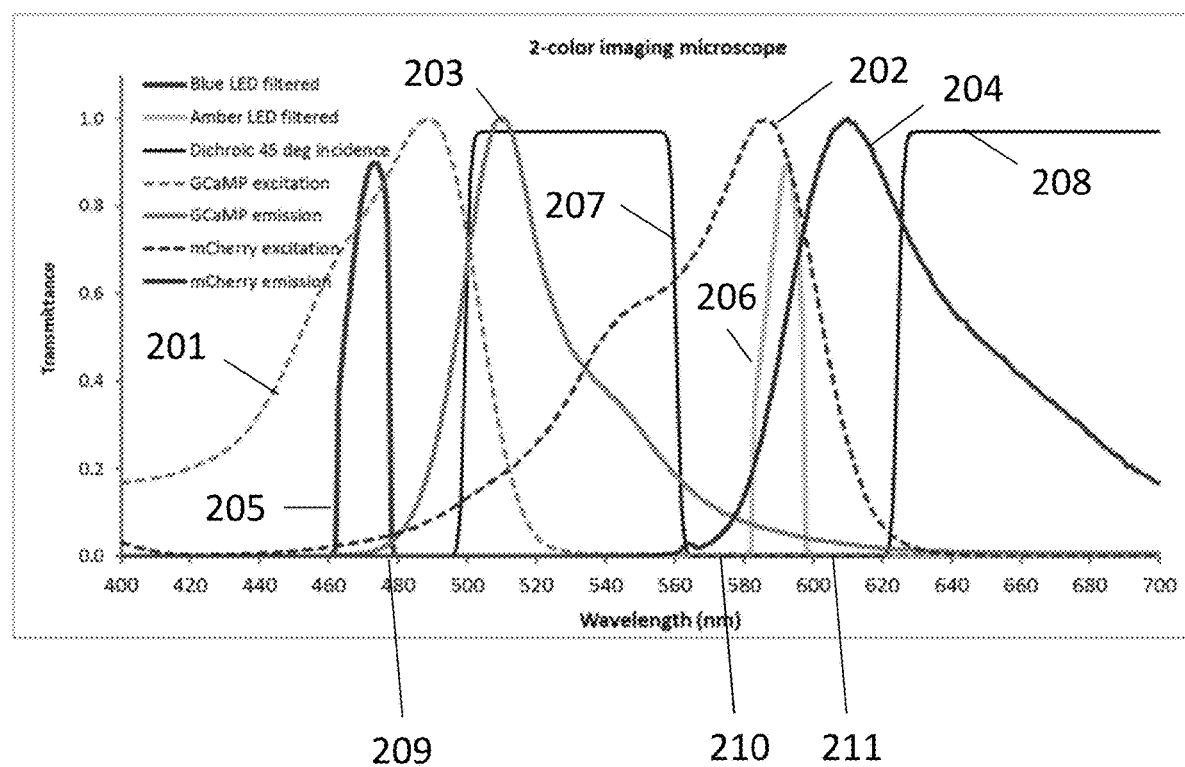
FIGS. 2A, B, and C show a wavelength domain depiction of a 2-color microscope at varying angles of incident light at a filter surface.

FIG. 2A shows a wavelength-domain depiction for a 2-color microscope including emission from one or more light sources, excitation and emission spectrum for one or more fluorophores, and transmittance passbands for a dichroic filter configured to filter light before the light is incident on the image capture circuit. As described herein, the passbands of the dichroic filter can be chosen such that stray light (e.g., emission from the first light source and second light source) is prevented from reaching the image capture circuit. The 2-color microscope can be a relatively small microscope with a total volume of less than about 0.1 $in^3$, 0.5 $in^3$, 1 $in^3$, 2 $in^3$, 3 $in^3$, 4 $in^3$, 5 $in^3$, 6 $in^3$, 7 $in^3$, 8 $in^3$, 9 $in^3$, or 10 $in^3$. In other embodiments, a similar wavelength-domain can describe a multi-color microscope configured to detect emission of three or more colors (e.g., discrete wavelength ranges). Any description herein of a 2-color microscope may apply to any other multi-color microscope capable of detecting multiple colors, such as two or more colors, three or more colors, four or more colors, five or more colors, or six or more colors.

The 2-color microscope corresponding to the wavelength domain shown in FIG. 2 can be a microscope configured to detect emission of two or more fluorophores, for example the fluorophores can be GFP and mCherry fluorophores. The wavelength domain shown in FIG. 2 includes an excitation spectrum for the GCaMP fluorophore 201 and the mCherry fluorophore 202. The wavelength domain also shows the emission spectrum for the GCaMP fluorophore 203 and the emission spectrum for the mCherry fluorophore 204.

Additionally, the wavelength domain in FIG. 2A shows an emission spectrum of a band pass filtered first light source (e.g., blue light emitting diode (LED)) 205 and an emission spectrum of a second band pass filtered light source (e.g., amber LED).

The wavelength domain depiction shown in FIG. 2A also shows a first transmittance passband 207 of the dichroic beam splitter and a second transmittance passband 208 of the dichroic beam splitter. In some cases, the dichroic beam splitter can have only one transmittance passband. In some cases, the dichroic beam splitter can have more than two transmittance passbands. The number of transmittance passbands of the dichroic beam splitter can be equivalent to the number of light sources or light channels. As shown in the wavelength-domain depiction the first and second transmittance passbands of the dichroic beam splitter can be spectrally separated from the emission spectrum of the first light source and the second light source. Emission from the first and second light source may not be transmitted by the dichroic beam splitter. Emission from the first and second light source can fall within a spectral range of the dead bands 209 and 210 of the dichroic beam splitter. In some cases, the first transmittance passband can permit transmission of light in a predetermined wavelength range. The wavelength range can be at least about 10 nm, 25 nm, 50 nm, 75 nm, 100 nm, 150 nm, 200 nm, 250 nm, 300 nm, 350 nm, 400 nm, 450 nm, 500 nm, 550 nm, 600 nm, 700 nm, 800 nm, 900 nm, or 1000 nm. In an example, the dichroic beam splitter can have a first transmittance passband 207 ranging from about 500 nm to about 560 nm at a design incident angle of about 45 degrees. The dichroic beam splitter can have a second transmittance passband 208 that permits transmission of light with a wavelength of about 625 nm and higher. A transition in transmittance between a dead band of the dichroic filter and a passband of the dichroic filter can have a step change behavior as a function of wavelength.

Figure 2B:
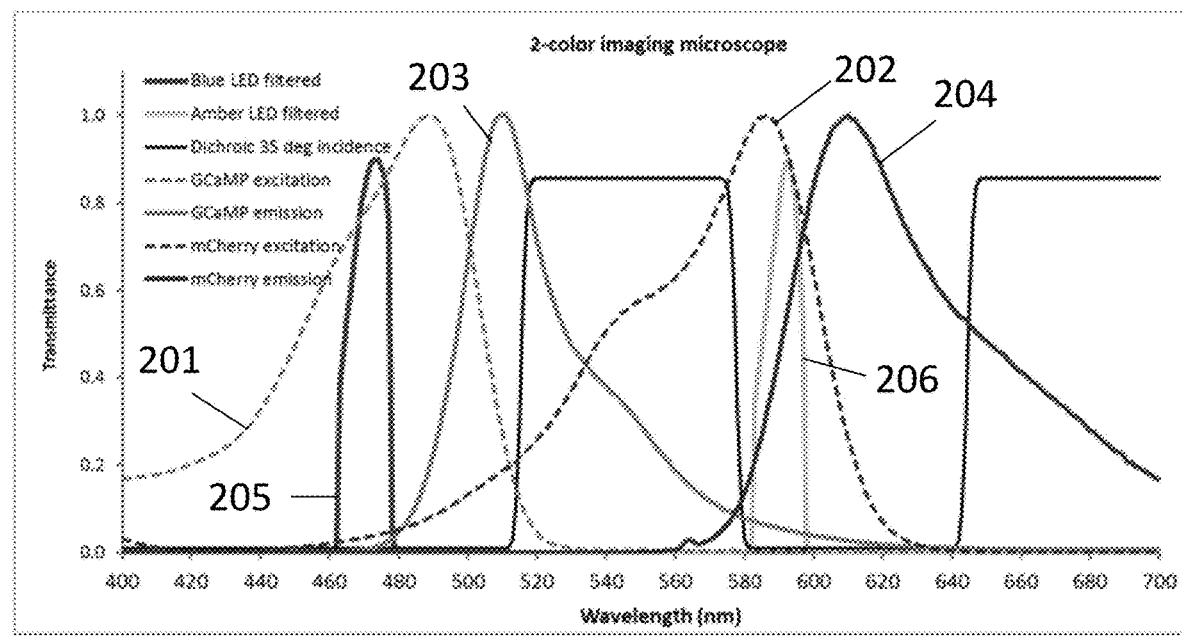
Figure 2C:
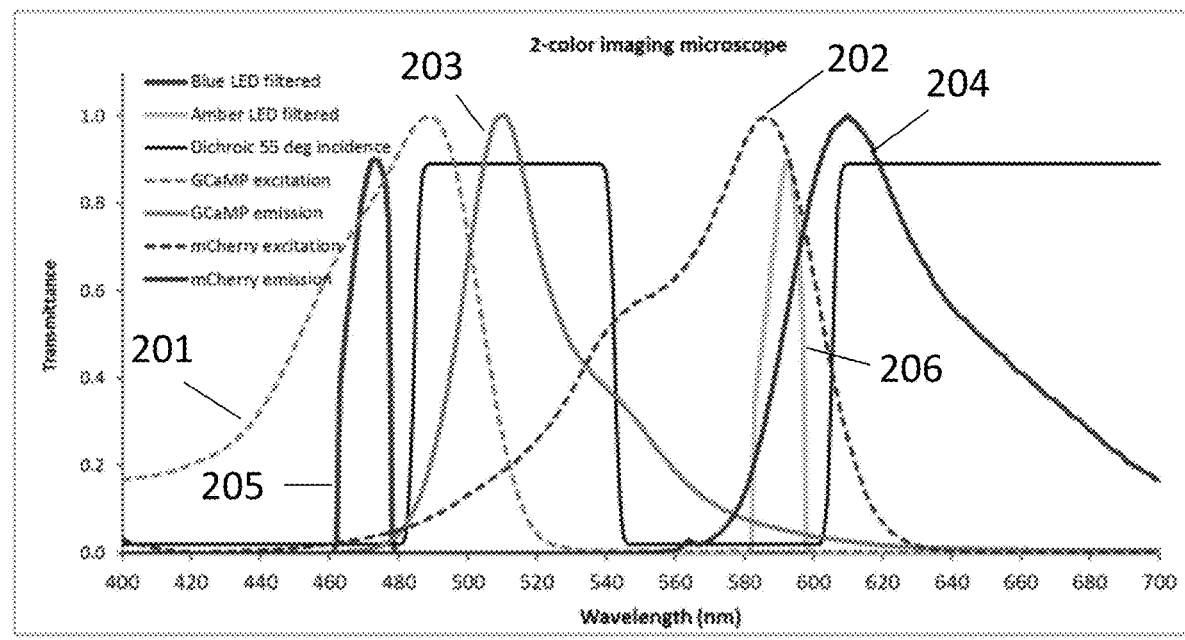

The wavelength ranges of the passbands of the dichroic beam splitter can be dependent on the incident angle of light on the dichroic beam splitter. FIG. 2B and FIG. 2C show shifts of the dichroic beam splitter's passbands at incident angles of about 35 degrees and 55 degrees respectively. At the incident angle of 55 degrees the dead band wavelength range approaches zero. Similarly, at the incident angle of 35 degrees a corresponding dead band wavelength range approaches zero.

The transmittance passbands of the dichroic beam splitter 207 and 208 can be chosen such that they do not overlap with the emission spectrum of the band pass filtered light sources 205 and 206 at extreme values of incident angle (e.g., angles at or approaching 30 degrees and/or angles at or approaching 60 degrees). Providing separation between the wavelength transmittance passbands of the dichroic beam splitter 207 and 208 and the emission spectrum of the band pass filtered light sources 205 and 206 can prevent stray (e.g., unwanted) light from reaching the sensor and/or detector and therefore can limit the unwanted light in an image generated by the microscope. The transmittance passbands of the dichroic beam splitter 207 and 208 can be chosen such that they do not overlap with the emission spectrum of a band pass filtered light sources 205 and 206 over a wide range of incident angles. The wide range of incident angles can comprise large field angles. The wide range of incident angles can comprise cone angles. The wide range of incident angles can include angles between about 0 degrees and about 90 degrees.

The dichroic beam splitter passband can be a function of incident angle of the light. The wavelength range of the dichroic beam splitter passband can change such that its range increases, decreases, and/or shifts as a function of the angles of incident light. In some cases, the filter system must comprise a dead band in order to ensure that the transmittance passbands of the dichroic beam splitter 207 and 208 do not overlap with the passbands of the emission spectrum of the band pass filtered light sources 205 and 206 for an entire chosen range of incident angles. The filters may prevent lights of selected wavelengths or wavelength ranges for the dead bands from passing through. The dead bands may be provided between wavelengths of light where one or more light sources emit light and that the filter permits light to pass. In the example shown in FIG. 2 the system can comprise a first dead band 209 from a wavelength of about 475 nm to about 500 nm, a second dead band 210 from about 560 nm to about 585 nm, and a third dead 211 band from about 595 nm, to about 625 nm. Alternatively or additionally, the dead bands can comprise other ranges of wavelengths. The ranges of wavelengths can be chosen anywhere within a range of wavelengths, for example any sub set of wavelengths in the range of wavelengths from 100 nm to 1000 nm can be chosen as a dead band. In some cases, the dead band can span a range of wavelengths within a range of at least about 10 nm, 20 nm, 30 nm, 40 nm, 50 nm, 60 nm, 70 nm, 80 nm, 90 nm, 100 nm, 150 nm, 200 nm, 250 nm, 300 nm, 350 nm, 400 nm, 450 nm, or 500 nm. The specific wavelengths and the size of the range of wavelengths can be chosen for the one or more dead bands such that unwanted light is not incident on the dichroic 110. The dead bands can be optimized such that sufficient light passes through the filter system to be detected by the sensors 118 to generate an image without allowing stray unwanted light into the image.

In some cases, the spectral widths of the dead bands can be reduced by operating the dichroic beam splitter at an angle closer to normal incidence.

In an example, the 2-color microscope can be a microscope configured to detect emission of two or more fluorophores, for example the fluorophores can be GFP and mCherry fluorophores. A wavelength domain associated with the microscope can include an excitation spectrum for the GFP fluorophore and the mCherry fluorophore. Additionally, the wavelength domain can include emission spectrum of a blue light emitting diode (LED) and an amber LED along with the band pass filter for the blue LED and the band pass filter for the amber LED. The wavelength domain description can also include transmittance of a 2-band dichroic beam splitter. A dichroic beam splitter of the 2-color microscope can have a first transmittance passband at a wavelength of about 500 nm to about 560 nm and second transmittance passband at about 625 nm and higher. The wavelength ranges of the passbands and of the dichroic beam splitter can be dependent on the incident angle of light on the dichroic beam splitter.

Alternatively or additionally, the filter system can comprise spatial filtering elements such as one or more baffles configured to block out unwanted light. The baffles can be placed in an optical path between the sample and the dichroic. The baffles can decrease stray unwanted light incident on the sensor and/or detector. The baffles can be used in combination with the use of the spectral dead bands. As another alternative, additional optics and/or filters can be used in combination with the use of the spectral dead bands to minimize stray unwanted light incident on the detector or sensor.

Multi-color imaging can experience chromatic aberration due to differences in wavelengths between different colors of light and the dependence of one or more components in the microscope system on wavelength of transmitted, reflected, and/or absorbed incident light. Light of different colors (e.g., wavelength ranges) can be transmitted differently through one or more optical element. In some cases, different colors (e.g., wavelengths) of light can have different focal lengths when focused through an optical element such as a lens. The microscope system 100 can comprise an objective lens 112. Optionally, the objective lens may comprise, and/or may be operably coupled to other lens elements such as a gradient index (GRIN) objective lens. The other lens elements may optionally comprise elongated and/or insertable lens elements. For example, the other lens elements may be configured to be inserted into the sample. Optionally, the other lens elements may be configured to contact the sample. The GRIN can be a lens in which the refractive index of the lens varies along a dimension perpendicular to the optical axis. The GRIN lens can comprise one or more flat surfaces. In some cases, the GRIN objective lens can have a focal length that is dependent on wavelength of light focused through the lens.

Figure 3:
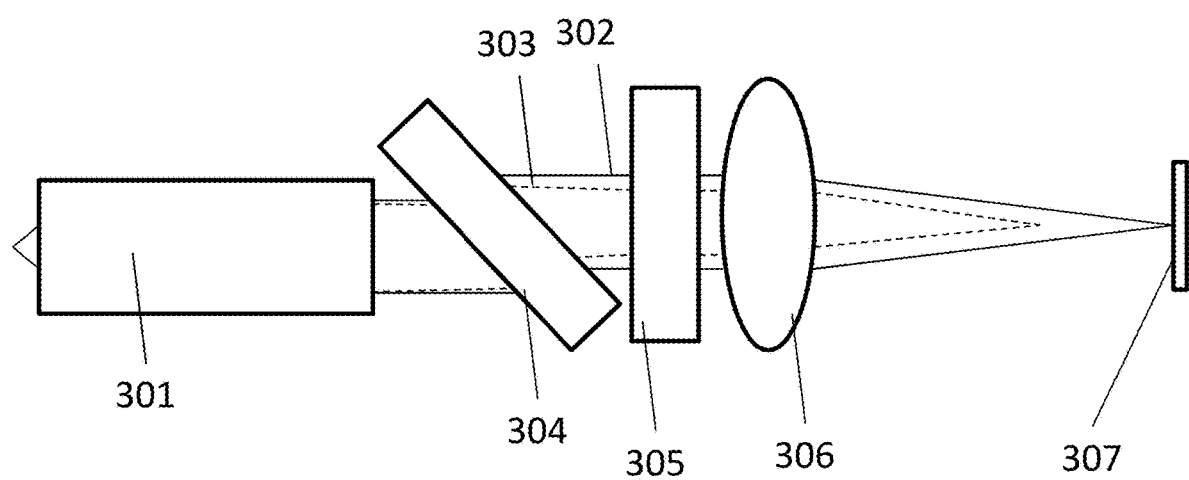
FIG. 3 shows an optical path configured to focus two or more colors of light with a chromatic aberration.

FIG. 3 shows two different colors of light being focused through a GRIN objective lens 301. Two or more different colors of light can be transmitted through the optical path shown in FIG. 3. The optical path 300 can comprise a plurality of optical elements. After passing through the GRIN lens 301 the light can pass through a dichroic filter 304. The dichroic filter 304 can direct one or more light rays in a specified direction. The dichroic filter can direct one or more light rays to another optical element in the optical path. The light can then pass through an achromatic lens 306 configured to focus incoming light onto a sensor 307.

A first light color 302 can have a relatively longer wavelength than a second light color 303. In an example, the two different colors of light can comprise green light and red light. Light of the first light color can travel through the optical path and focus on the sensor. Light of the second light color can travel through the optical path and focus before the sensor. The focal point of the first light color and the focal point of the second light color can be separated by a distance of at least about 50 microns, 100 microns, 150 microns, 200 microns, 250 microns, 300 microns, 350 microns, 400 microns, 450 microns, or 500 microns along an optical axis.

Figure 4:
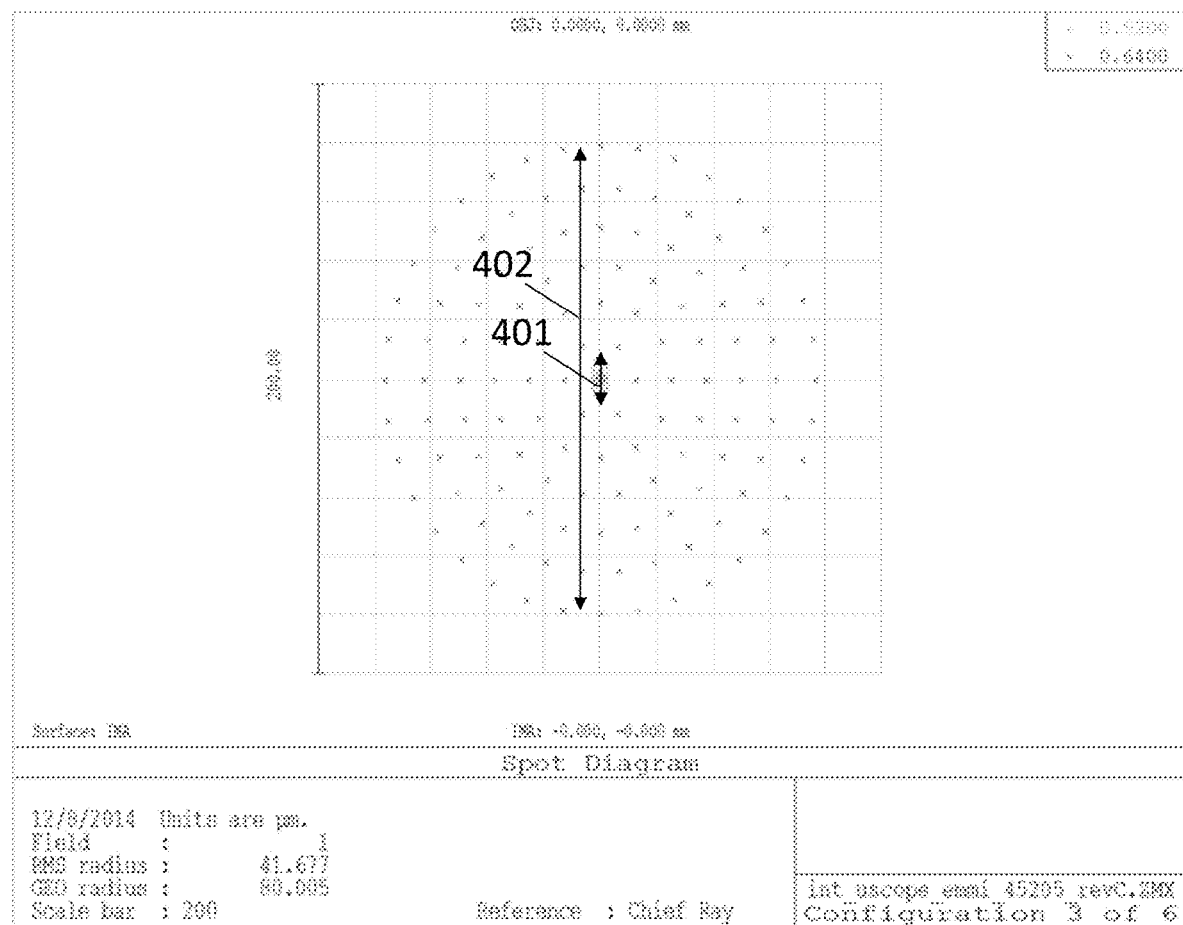
FIG. 4 shows a spot diagram of light transmitted through an optical path with a chromatic aberration.

Similarly the spot diameter of the first light color and the spot diameter of the second light color can vary relative to each other at a chosen location along the optical axis. FIG. 4 shows the spot diameter of the light with the relatively shorter wavelength (e.g., green light) 401 and the spot diameter of the light with the relatively longer wavelength (e.g., red light) 402 at the location along the optical axis where the light with the relatively shorter wavelength is focused (e.g., the green light focal point). The spot diameter of the light with the relatively longer wavelength can be bigger than the spot diameter of the light with the relatively shorter wavelength by at least about 2×, 5×, 10×, 12×, 14×, 16×, 18×, 20×, 25×, or 50×.

Figure 5:
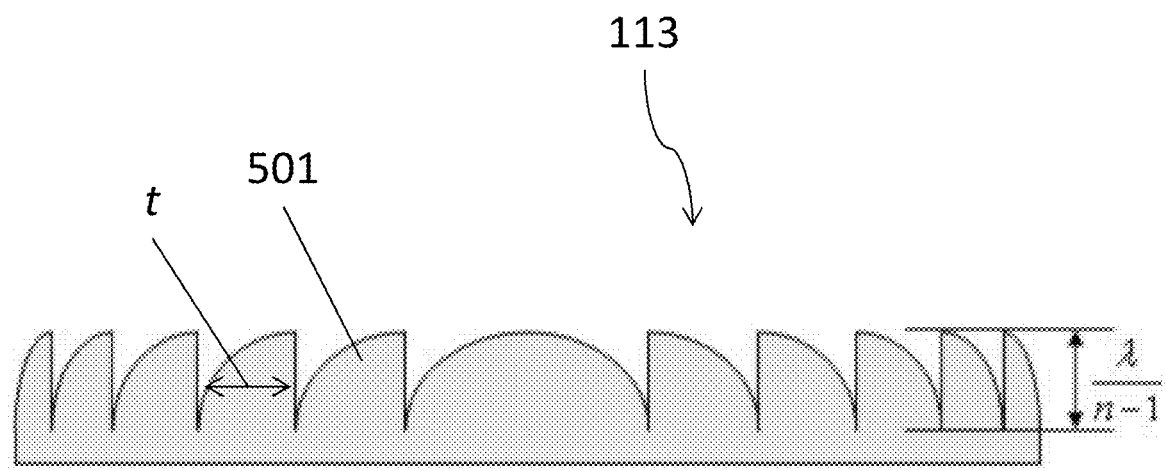
FIG. 5 shows a cross section of a diffractive optical element.

In some cases, an imaging process can be improved by minimizing and/or eliminating the chromatic aberration such that two or more colors of light focus at substantially the same location and with a substantially equivalent spot diameter in the optical axis. Provided herein are systems and methods to minimize or eliminate the chromatic aberration without substantially increasing the size of the microscope. A single element can be included in the optical system to correct the chromatic aberration. The chromatic aberration can be corrected without requiring an addition of two or more lenses to the optical system. FIG. 5 shows a cross section view of a DOE element 113. The microscope can be fitted with a diffractive optical element (DOE) 113 configured to focus two or more colors of light in substantially the same location. The DOE can comprise a surface relief element. The DOE can comprise a volume holographic element. The DOE can be attached to surface of the GRIN lens. The DOE can be thin relative to the thickness of the GRIN lens. The DOE can be attached to an end of the GRIN lens closest to the dichroic beam splitter. Alternatively, the DOE can be attached to another element in an optical path of the microscope. The optical path can comprise one or more DOEs.

The DOE can comprise a surface embossed with a series of concentric rings. The concentric rings can be configured to alter a phase of light transmitted through the DOE. The concentric rings can be configured to cause a phase shift in the light transmitted through the DOE. The phase shift can be a backwards phase shift. The DOE can comprise at least about 2, 3, 4, 5, 10, 15, 20, 25, 30, 35, 40, 45, 50, 100, 200, 300, 400, 500, or 1000 concentric rings. In some cases, the radial spacing between the concentric rings can be uniform. Alternatively, the radial spacing between the concentric rings can be variable such that a first subset of the rings is spaced relatively closer together than a second subset of the rings.

The DOE can comprise a planar element. Alternatively the DOE can comprise a spherical or aspherical element. The DOE can be attached to a planar, spherical, or aspherical surface. The DOE can comprise a plurality of concentric rings 501. The rings can protrude from a surface of the DOE. The rings can be raised from a surface of the DOE. In some cases, the height of the concentric rings can be designed according to the equation, $$h = \frac{\lambda}{n-1},$$

where h is the height of the concentric ring, λ is an operating wavelength, and n is the refractive index of a lens substrate. The operating wavelength can be a discrete wavelength or a range of wavelengths corresponding to light signals of different colors detected by the microscope. In some cases, the thickness t of the concentric rings can decrease from the center line of the DOE to the edge. In some cases the thickness of the concentric rings can decrease gradually from the centerline to the edge of the DOE. Radiating out from the centerline of the DOE each consecutive ring can have a thickness that is at most about 99%, 95%, 90%, 85%, 80%, 75%, 70%, 65%, 60%, 55%, 50%, 45%, 40%, 35%, 30%, 25%, 20%, 15%, 10%, or 5% of the thickness of a previous ring (e.g., a ring closer to the center of the DOE).

The magnitude of the phase shift experienced by light transmitted through the DOE can be a function of wavelength of the light. For example, the red light can experience a larger phase shift relative to the green light. The DOE can be configured such that the phase shift experienced by a first wavelength of light and the phase shift experienced by a second wavelength of light results in the first wavelength of light and the second wavelength of light have substantially the same focal point and spot diameter in the optical axis when focused by the microscope. In some cases, the DOE can be configured to correct monochromatic beam aberrations in addition to or instead of altering the focal point of one or more light emissions.

Figure 6:
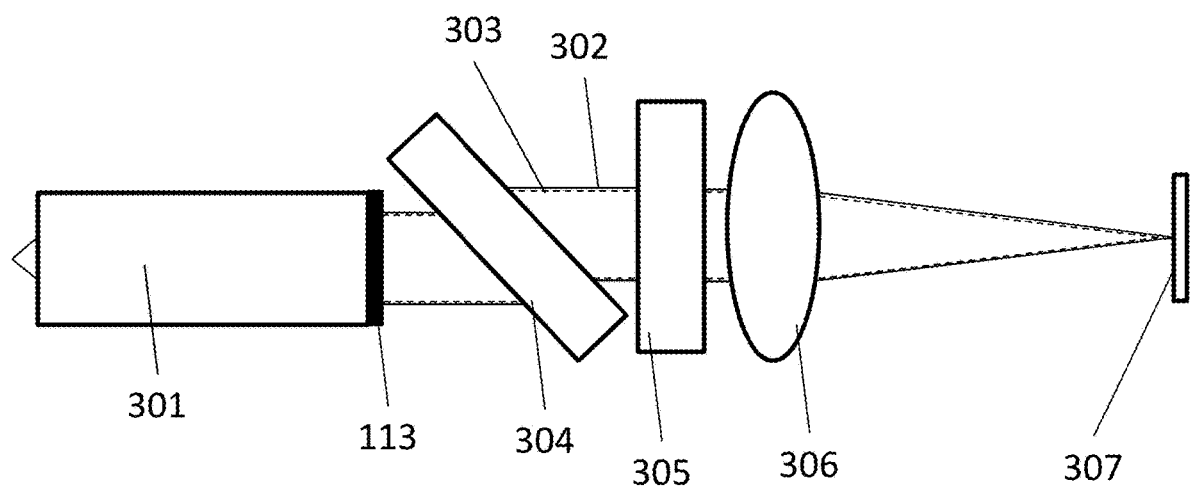
FIG. 6 shows an optical path configured to focus two or more colors of light comprising a corrective element to eliminate chromatic aberration.

FIG. 6 shows an optical path incorporating a DOE 113. The optical path can be similar to the optical path shown in FIG. 3 except for the addition of the DOE 113. The DOE 113 can be attached to a surface of the GRIN objective lens 301. The DOE 113 can be attached to a surface of the GRIN objective lens 301 closest to the dichroic beam splitter 304. Alternatively the DOE 113 can be attached to another surface of the GRIN objective lens or another surface of another optical element. Two or more different colors of light 303, 302 can be transmitted through the optical path shown in FIG. 6. The first color of light can have a relatively longer wavelength compared to the second color of light. In an example, the two different colors of light can be red light and green light. In the optical path shown in FIG. 6 the two different colors of light can have a focal point at substantially the same location. The distance along an optical axis between a focal point of a first wavelength of light and a focal length of a second wavelength of light can differ by at most about 25%, 20%, 15%, 10%, 5%, 1%, 0.1%, 0.01%, 0.001%, or 0.0001%.

Figure 7:
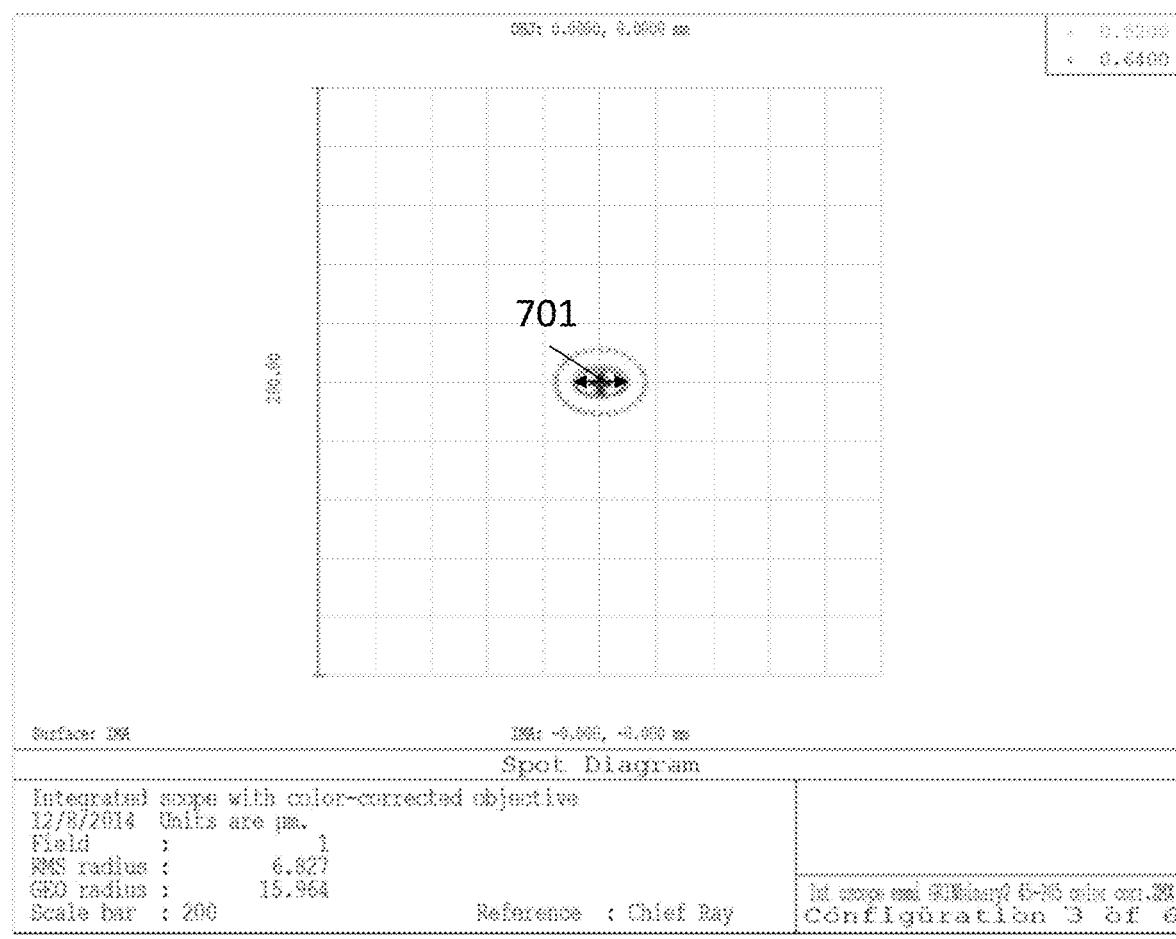
FIG. 7 shows a spot diagram of light transmitted through an optical path with a corrective element configured to eliminate chromatic aberration.

FIG. 7 shows a spot diagram at an image sensor plane for the two different colors of light (e.g., red and green light) where the two different colors of light have been chromatically corrected by the DOE as described by the system shown in FIG. 6 or a similar optical system. The spot radius 701 for the two different colors of light can be substantially the same. The spot radius for the first color of light and the spot radius for the second color of light can differ by at most about 25%, 20%, 15%, 10%, 5%, 1%, 0.1%, 0.01%, 0.001%, or 0.0001%.

In some cases, multi-color imaging can be performed using a microscope probe. In some cases the microscope probe can be an endoscopy probe. The microscope probe can be configured for insertion into an organ and/or orifice of a living or once living organism. The probe can be inserted into a tissue of a living or non-living organism. The probe can be inserted into the organism while the organism is awake. The probe can be inserted into the organism while the organism is freely moving. The probe can be inserted into the organism through an incision formed during a surgical procedure. The probe can be a straight probe or a bent probe. The probe can be rigid or flexible. The probe can have a diameter of at most about 100 mm, 50 mm, 40 mm, 30 mm, 20 mm, 10 mm, 5 mm, 4 mm, 3 mm, 2 mm, 1 mm, 0.5 mm, 0.25 mm, 0.1 mm, 0.05 mm, 0.01 mm, 0.005 mm, or 0.001 mm. The probe can have a length of at least about 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm. At least a portion of the length of the probe can be inserted into the organism while the probe is in use.

In some cases, the small multi-color microscope can be connected with a microscope probe. The probe can be connected to a housing that contains the microscope. In some cases the probe and the microscope can be connected through a light transmitting element (e.g., fiber optic element). Multi-color imaging with a multi-color microscope probe can experience similar issues with chromatic aberration as described for the microscope system above. A corrective element can be provided in the probe to substantially correct the chromatic aberration. In some cases, two or more DOEs can be used in series if a single DOE is insufficient to correct the aberration. The corrective element can comprise a diffractive optical element (DOE) as described previously or a holographic element. The DOE can correct chromatic aberration without substantially increasing the length of the probe. The DOE can correct chromatic aberration without substantially increasing the width of the probe. In some cases adding the DOE to the probe can increase the length of the probe at most about 100%, 90%, 80%, 70%, 60%, 50%, 40%, 30%, 20%, 10%, 5%, 1%, 0.1%, 0.01%, or 0.001% compared to a similar probe without the DOE element. In some cases adding the DOE to the probe can increase the diameter of the probe at most about 100%, 90%, 80%, 70%, 60%, 50%, 40%, 30%, 20%, 10%, 5%, 1%, 0.1%, 0.01%, or 0.001% compared to a similar probe without the DOE element. The multi-color microscope probe may be used in addition to or in place of the objective lens as previously described. The multi-color microscope probe may be inserted into a subject. The probe may or may not contact a sample, such as tissue, to be imaged.

In some cases, the corrective element can be most effective at correcting the chromatic aberration when the corrective element is located at or near a plane that is conjugate with a focal plane of incident light, i.e. a pupil plane. In some optical arrangements, for example, optical arrangements comprising a GRIN objective lens, the pupil plane can be located inside of the GRIN lens. One method of placing the corrective element inside of the GRIN lens can comprise cleaving the GRIN lens and placing the corrective element inside of the lens. Alternatively, the GRIN lens can be manufactured with a corrective element embedded inside of the GRIN at a pupil plane location for incident light.

In some cases, inclusion of the corrective element inside of the GRIN lens can require an air space. The air space can be adjacent to the corrective element. Inclusion of the air space can decrease the structural strength of the GRIN lens and/or the probe. Decreasing the structural strength can decrease the mechanical strength of the GRIN lens and/or the probe in its response to compressive, torsional, and/or tension stresses. In some cases, external reinforcements can be provided to restore the structural strength of the lens and/or probe. The external reinforcements can increase the size of the probe in at least one dimension (e.g., length or girth). The increased probe size can require a larger incision in an organism to permit insertion of the larger probe into the organism. In some cases, the increased probe size can prevent the probe from being easily inserted into an organ and/or orifice.

In some cases the corrective element can be a volume holographic element. The volume holographic element can be inserted into the lens without an air space. The volume holographic element may not require an air space when placed at pupil plane of the incident light inside of a lens. The volume holographic element can be bonded to surfaces of two adjacent GRIN lenses. The probe comprising the volume holographic element can have sufficient structural strength such that an external reinforcement is not necessary. The probe comprising the volume holographic element can be configured to correct chromatic aberrations without requiring external reinforcement of the probe. The probe comprising the volume holographic element can be configured to correct chromatic aberrations without increasing the size of the probe relative to a probe without the volume holographic element.

Figure 8:
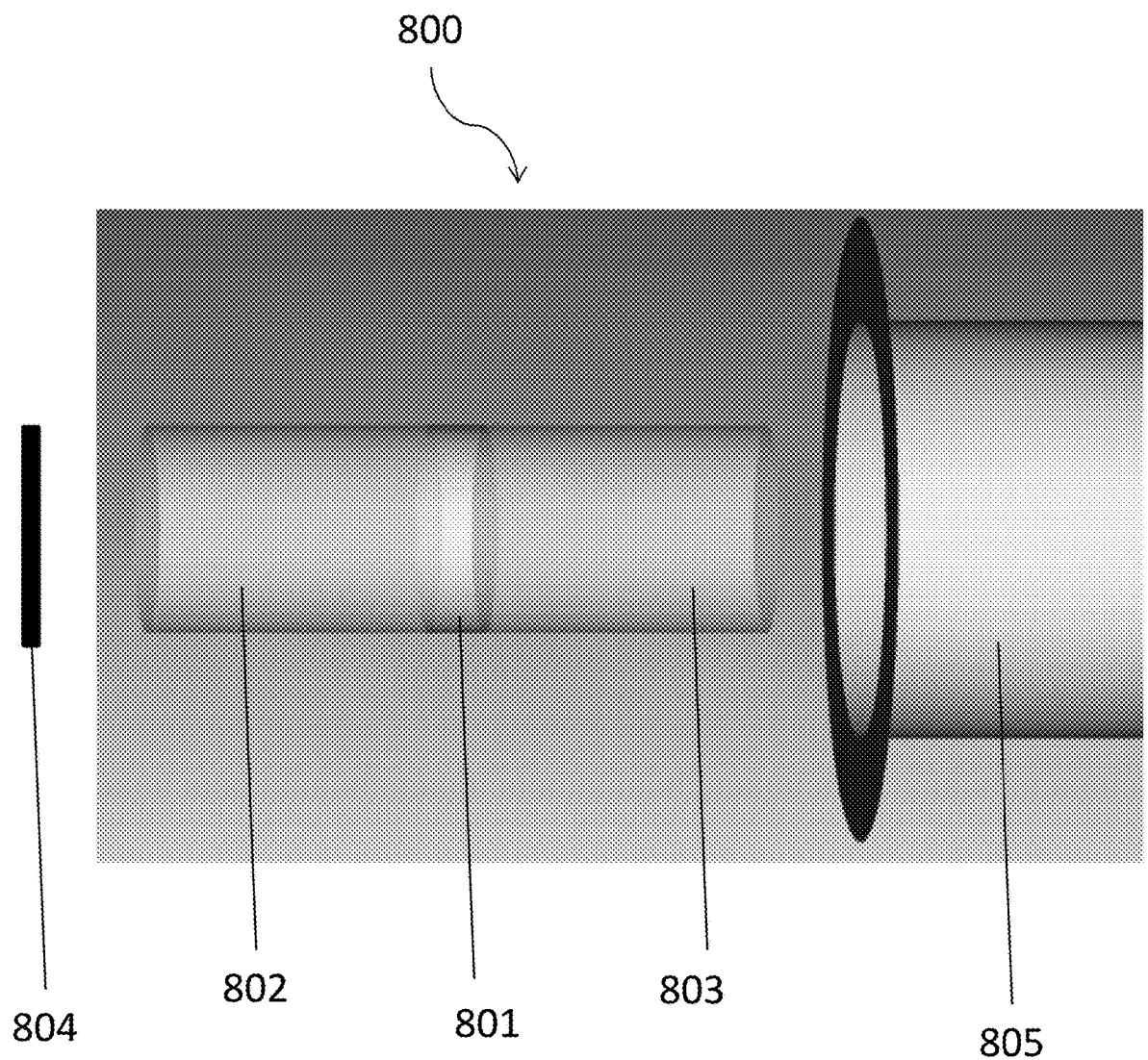
FIG. 8 shows a probe configured to perform multi-color microscopy with a correction for chromatic aberration.

FIG. 8 shows a diagram of a probe 800 comprising the volume holographic element 801 configured to correct chromatic aberrations. The holographic element 801 is bonded to a face of a first GRIN lens 802 on one side of the holographic element 801 and bonded to a face of a second GRIN lens 803 on a another side of the holographic element 801. The first GRIN lens 802 and second GRIN lens 803 are parts of a split GRIN lens. The split GRIN lens and the holographic element are in an optical axis with an imaging plane 804 and a microscope objective 805.

Figure 9:
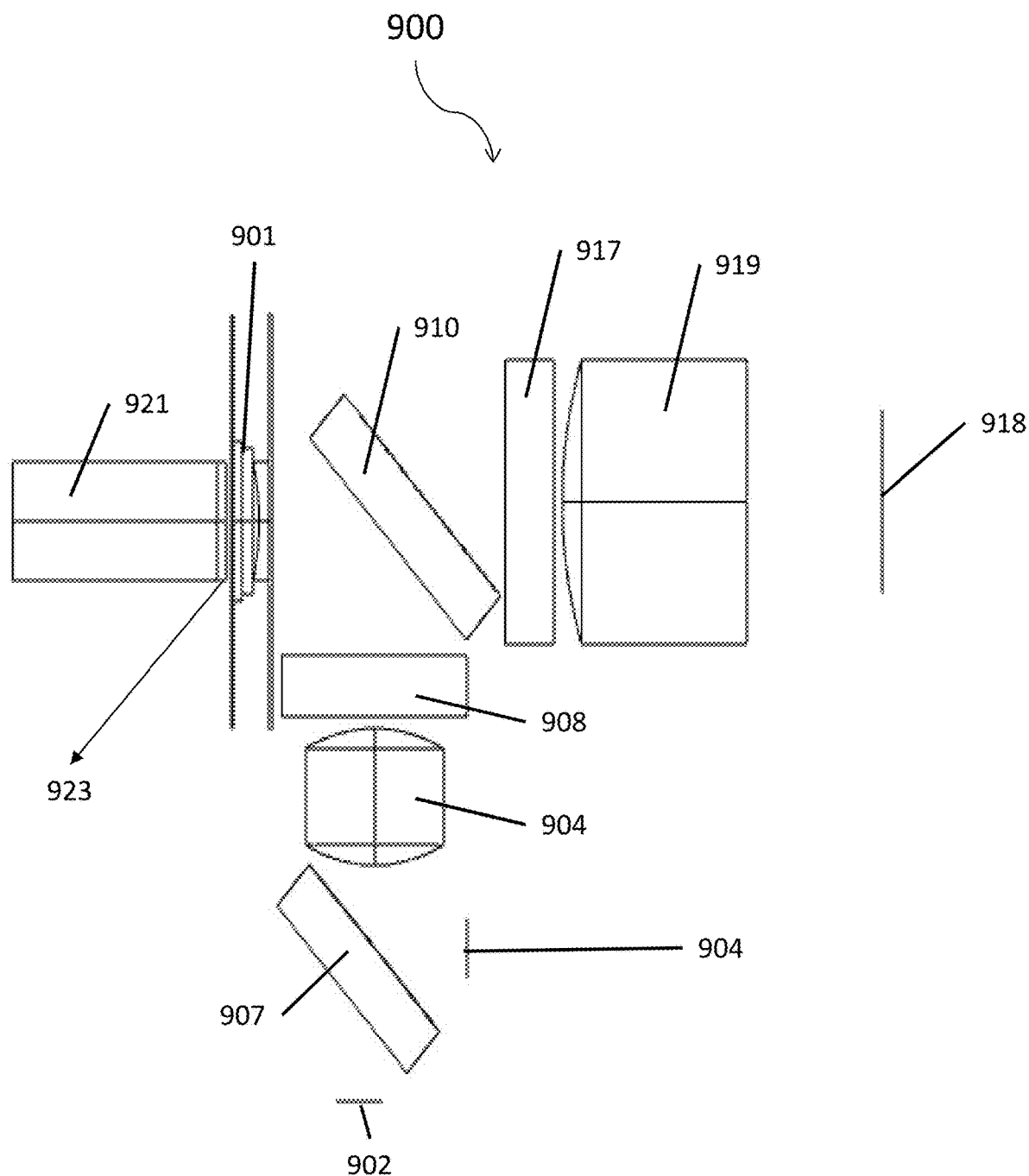
FIG. 9 shows an optical configuration that includes an adjustable lens.

FIG. 9 shows an optical configuration 900 that includes an adjustable lens 901. FIG. 9 may illustrate a multi-color microscope system substantially as described with respect to FIG. 1. For example, the system may comprise optical arrangements 902, 904, light source combining element 907 such as a dichroic mirror, lens 909, optical filters 908, 917 such as excitation filters and/or emission filters, mirror 910 such as a dichroic mirror, lens 919, and sensor 918 such as an image capture circuit. Optionally, the optical configuration may comprise a one or more lens elements. For example, the optical configuration may comprise an objective lens, which may be operably coupled to or may comprise a GRIN lens 921 as described above. The GRIN lens may or may not comprise a corrective element 923.

Optionally, other optical elements may be provided for correcting chromatic aberrations. In some instances, the other optical element may be an adjustable lens 901. The other optical elements may be provided in any location in an optical path of the system shown in FIG. 9. For example, the other optical element may be configured to receive light generated by optical arrangements (or light sources) after the excitation filter 908 and/or dichromic mirror 910. Optionally, the other optical element may be configured to receive emission light (e.g. epifluorescent light) from a target after the GRIN lens 921. In some instances, the other optical element may be configured to receive emission light from the target before the dichroic mirror 910 and/or emission filter 917. While the adjustable lens is shown at a specified location in the optical path in FIG. 9, it is to be understood that the adjustable lens (or other optical elements) may be placed in any other location. For example, the adjustable lens could be placed in between optical filter 917 and lens 919 and perform substantially as described throughout.

Each of the depicted elements may be contained within a single housing as substantially described elsewhere, e.g. with respect to FIG. 1. Alternatively, some of the depicted elements may be contained within the single housing while other elements are located outside of the single housing. For example, optical element 921 may be located outside the housing while other elements are located within the housing. The optical element 921 may or may not be in contact with other optical elements such as the adjustable lens.

The adjustable lens may comprise a size amenable for integration with the small microscope system described throughout. In some instances, the adjustable lens may comprise a radius equal to or less than about 1 mm, 2 mm, 3 mm, 4 mm, 5 mm, 6 mm, 7 mm, 8 mm, 9 mm, 10 mm, 12 mm, 14 mm, 16 mm, 18 mm, or 20 mm. Optionally, the adjustable lens may comprise variable radii. In some instances, the adjustable lens may comprise a thickness or height equal to or less than about 1 mm, 2 mm, 3 mm, 4 mm, 5 mm, 6 mm, 7 mm, 8 mm, 9 mm, 10 mm, 12 mm, 14 mm, 16 mm, 18 mm, or 20 mm. Optionally, the adjustable lens may comprise variable height.

The adjustable lens may comprise adjustable parameters. For example, the adjustable lens may comprise a variable focal length. As another example, the adjustable lens may comprise a variable optical axis. In some instances, the adjustable lens may be tilted and/or dithered. The adjustable lens may or may not be tilted about its optical axis. In some instances, an optical axis of the adjustable lens may be tilted or adjusted. In addition, the adjustable lens may comprise a variable radii and/or height as discussed above.

The adjustable lens may comprise a deformable lens. Alternatively or in addition, the adjustable lens may comprise movable components, e.g. movable optical elements. The adjustable lens may be adjusted by electro-optical means, mechanical means, electromechanical means, thermo-optical means, and/or acoustomechanical means. For example, by applying voltage to the lens and/or components associated with the adjustable lens, a focal length of the lens may be adjusted. For example, by applying voltage to the lens and/or components associated with the adjustable lens, the lens may be tilted. An adjustable lens adjustable by any electric related means may herein also be referred to as an electronic lens.

In some instances, the adjustable lens may be operably coupled to a piezoelectric component or a mechanical component. For example, a lens fluid may be pumped into or out of a lens enclosure which expands or retracts the lens membrane to achieve varying focus and/or zoom. For example, an actuator may push or release a deformable wall to change a volume of liquid in a chamber to adjust a curvature of a lens, e.g. liquid lens. In some instances, the piezoelectric component may generate a mechanical stress, in response to an electric voltage, to adjust parameters of the adjustable lens. As non-limiting examples, the adjustable lens may comprise a liquid lens, an electro-wetting lens, a liquid-crystal lens, and/or a piezoelectric driven lens.

The adjustable lens may be utilized in bringing images into focus, and/or correcting chromatic aberrations. The chromatic aberration may be actively corrected via the adjustable lens in some instances. In some instances, the adjustable lens may be utilized to axially correct chromatic aberrations. For example, the chromatic aberration may be corrected or mitigated by changing a focal length of the lens as appropriate. For example, as previously described herein, multi-color imaging may experience chromatic aberration as different colors (e.g. differing wavelengths) of light may be focused differently by optical elements such as a lens. Accordingly, for different wavelengths (e.g. range of wavelengths) of light, it may be necessary to adjust a focal length of the adjustable lens in order to bring an image into focus. The adjustable lens may comprise a focal length equal to or more than about 10 mm, 15 mm, 20 mm, 25 mm, 30 mm, 40 mm, 50 mm, 60 mm, 70 mm, 80 mm, 90 mm, 100 mm, 120 mm, 140 mm, 160 mm, 180 mm, 200 mm, 220 mm, 240 mm, 260 mm, 260 mm, or 300 mm. In some instances, the adjustable lens may be adjusted to have any of the previously referred focal length at a given time point. In some instances, the adjustment to the focal length of the adjustable lens may be synchronized with the sensors (e.g. image capture sensors) to ensure in-focus images are captured.

Alternatively or in addition, the adjustable lens may be utilized to correct chromatic aberration in a lateral plane. For example, chromatic aberration in the lateral plane may be corrected or mitigated by tilting the adjustable lens at an appropriate tilt angle. Tilting an adjustable lens as referred herein may refer to tilting the adjustable lens itself. Alternatively or in addition, tilting the adjustable lens may refer to adjusting the adjustable lens (e.g. deforming the lens, adjusting a curvature of the liquid lens) such that an optical axis of the adjustable lens is tilted or varied. The tilt angle may or may not be about the optical axis of the adjustable lens. Optionally, the adjustable lens may be configured to be tilted an a tilt angle equal to or more than about 0.1°, 0.2°, 0.3°, 0.4°, 0.6°, 0.8°, 1°, 1.2°, 1.5°, 2°, 2.5°, 3°, 4°, 5°, 6°, 7°, 8°, 9°, 10°, 12°, or 15°.

In some instances, the adjustable lens may tilt in a radial or circular pattern while images are captured by the sensors (e.g. image capture circuit). In some instances, the adjustable lens may be dithered (e.g. by inducing random variations in tilt angle and direction) to simulate or create a radial effect, e.g. if the dithering is done at a sufficient rate. Subsequently, a plurality of images captured in conjunction with the dithering or tilting of the lens may be processed. The plurality of captured images may comprise differing tilt angles. The differing tilt angles may refer to tilt angles that differ in magnitude, or differ in a tilt direction about the optical axis. In some instances, the plurality of images may be captured at tilt angles having same or similar magnitudes (e.g. about the original, untilted, optical axis). Alternatively, the plurality of images may be captured at tilt angles having differing magnitudes (e.g. about the original, untilted, optical axis).

In some instances, the adjustable lens may be tilted at a predetermined magnitude and be adjusted, or tilted, in a circular pattern about the original optical axis and rotate 360 degrees about the untilted optical axis. Subsequently, the adjustable lens may be tilted at a second, third, fourth, fifth, or more predetermined magnitudes and the process may be repeated while a plurality of images are captured. The plurality of captured images may be utilized or processed to correct for chromatic aberration.

One or more processors may be provided to aid in correcting chromatic aberration. For example, the one or more processors may individually or collectively utilize a plurality of captured images to correct for chromatic aberration. The plurality of images may be the images captured with the adjustable lens tilted (e.g. in a circular or radial pattern) as described above. The one or more processors, individually or collectively, may process the plurality of images to obtain an image with reduced chromatic aberration. In some instances, the plurality of images captured may be combined, e.g. in post processing of the images. Combining, or processing the plurality of captured images with differing tilt angles of the adjustable lens may reduce or eliminate chromatic aberration, e.g. in the lateral plane. The differing tilt angles may refer to tilt angles that differ in magnitude, or in direction about the optical axis. In some instances, the plurality of captured images may be equal to or more than about 5 images, 10 images, 15 images, 20 images, 25 images, 30 images, 40 images, 50 images, 60 images, 80 images, 100 images, 150 images, 200 images, 250 images, 300 images, 400 images, or 500 images.

In some instances, the tilting and/or dithering may be synchronized with the sensors, e.g. image capture sensors. For example, the adjustable lens may dither or tilt according to an image capture rate of the sensors. Alternatively, the adjustable lens may dither or tilt at a rate greater than an image capture rate of the sensors. Alternatively, the adjustable lens may dither or tilt at a rate lesser than an image capture rate of the sensors. The image capture circuit may capture images at a rate equal to about or more than 10 fps, 15 fps, 20 fps, 25 fps, 30 fps, 40 fps, 50 fps, 60 fps, 80 fps, 100 fps, 120 fps, 140 fps, 160 fps, 180 fps, 200 fps, 220 fps, 240 fps, 280 fps, 320 fps, 360 fps, 400 fps, or more. The adjustable lens may be adjusted (e.g. tilted, dither, etc) at a rate equal to or more than about 10 adjustments per second, 15 adjustments per second, 20 adjustments per second, 25 adjustments per second, 30 adjustments per second, 40 adjustments per second, 50 adjustments per second, 60 adjustments per second, 80 adjustments per second, 100 adjustments per second, 120 adjustments per second, 140 adjustments per second, 160 adjustments per second, 180 adjustments per second, 200 adjustments per second, 220 adjustments per second, 240 adjustments per second, 280 adjustments per second, 320 adjustments per second, 360 adjustments per second, 400 adjustments per second, or more.

In some instances, adjustable lens may be especially useful for multi-color imaging applications. As previously described herein, multi-color imaging may experience chromatic aberration or may capture out of focus images as different colors (e.g. wavelengths) of light can have different focal lengths when focused through an optical element such as a lens. Accordingly, for different wavelengths (e.g. different ranges of wavelengths), utilizing differing focal lengths may be appropriate or necessary to bring an image into focus. In some instances, the adjustable lens may be adjusted such that the focal length is appropriate to bring an image into focus for the different wavelengths of light. Optionally, one or more processors may be provided to vary a focal length of the imaging system (e.g. adjustable lens) such that captured images are always in focus for differing wavelengths of light.

In some instances, different optical arrangements or light sources emitting differing ranges of wavelengths of lights may be temporally multiplexed. In conjunction with the temporal multiplexing of the optical arrangements or light sources, the adjustable lens may be adjusted such that the imaging system is able to capture in-focus images for differing wavelengths of light. In some instances, the adjustable lens' focal length may be adjusted substantially simultaneously with the temporal multiplexing of the optical arrangements or light sources in order to bring captured images into focus. Alternatively, the adjustable lens' focal length may be adjusted substantially sequentially with the temporal multiplexing of the optical arrangements or light sources in order to bring captured images into focus. In some instances, one or more processors may be provided to ensure that the focal length of the imaging system or adjustable lens is adjusted appropriately according to light (e.g. excitation light) produced by the optical arrangements or light sources to bring captured images into focus. Alternatively or in addition, the one or more processors may be provided to ensure that the focal length of the imaging system or adjustable lens is adjusted appropriately according to light (e.g. emission light) produced by the samples to bring captured images into focus. Additionally, the adjustable lens may be tilted and/or dithered to mitigate or correct for chromatic aberrations as referred to above.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A multi-color microscope system, wherein the system comprises:
    a first light directing arrangement configured to direct light emitted at a first range of wavelengths to a sample;
    a second light directing arrangement configured to direct light emitted at a second range of wavelengths to the sample, wherein the first range of wavelengths and the second range of wavelengths are different;
    a dichroic filter configured to block light in at least two ranges of wavelengths such that light passes through the dichroic filter from the sample, wherein such light passing through (1) does not have a wavelength that overlaps with a wavelength of light that reaches the sample via the first light directing arrangement, and (2) does not have a wavelength that overlaps with a wavelength of light that reaches the sample via the second light directing arrangement, regardless of angle of incidence of light emission from the sample on the dichroic filter; and
    a detector configured to receive at least two non-overlapping wavelength ranges of the light emission from the sample generated in response to (1) the light directed through the first light directing arrangement, and (2) the light directed through the second light directing arrangement, after the light emission passes through the dichroic filter.

2. The system of claim 1, wherein the microscope system is contained in a housing equal to or less than about 1 cubic inch in size.

3. The system of claim 1, wherein the first light directing arrangement and the second light directing arrangement provide light to the sample simultaneously.

4. The system of claim 1, wherein the first light directing arrangement comprises a first light source that emits light at the first range of wavelengths and wherein the second light directing arrangement comprises a second light source that emits light at the second range of wavelengths, wherein said second light source is different than the first light source.

5. The system of claim 4, wherein the first range of wavelengths is less than about 500 nanometers (nm), and wherein the second range of wavelengths is greater than about 500 nm.

6. The system of claim 1, wherein the first light directing arrangement is in optical communication with a light source that is off board the microscope system.

7. The system of claim 1, wherein the first light directing arrangement and the second light directing arrangement share at least one common optical element.

8. The system of claim 1, wherein the first light directing arrangement and the second light directing arrangement provide light to the sample with alternately pulsing light pulses.

9. The system of claim 1, wherein the detector is a monochrome sensor.

10. The system of claim 1, wherein the detector is a multi-color detector comprising one or more color filters.

11. The system of claim 1, wherein the system further comprises one or more baffles (1) in an optical path between the sample and the dichroic filter and (2) configured to reduce stray light from being incident on the detector.

12. The system of claim 1, wherein the first light direction arrangement and the second light direction arrangement receive light from a single light source configured to produce light in two or more distinct wavelength ranges, wherein the two or more distinct wavelength ranges comprises the first range of wavelengths and the second range of wavelengths.

13. The system of claim 12, wherein the single light source comprises a plurality of spatially distributed light emitting diodes (LEDs), each LED in the plurality configured to produce light in at least one of the two or more distinct wavelength ranges.

14. The system of claim 1, wherein the first light directing arrangement is configured to direct light emitted at the first range of wavelengths to the sample along a first optical path, and wherein the second light directing arrangement is configured to direct light emitted at the second range of wavelengths to the sample along a second optical path different from the first optical path.

15. The system of claim 1, wherein the first light directing arrangement comprises a first optical element that is not part of the second light directing arrangement, and wherein the second light directing arrangement comprises a second optical element that is not part of the first light directing arrangement.

16. The system of claim 1, wherein the first light directing arrangement is configured to direct light emitted at the first range of wavelengths to the sample via reflection by the dichroic filter, wherein the second light directing arrangement is configured to direct light emitted at the second range of wavelengths to the sample via reflection by the dichroic filter.

* * * * *

UNITED STATES PATENT AND TRADEMARK OFFICE
CERTIFICATE OF CORRECTION

PATENT NO. : 10,908,405 B2
APPLICATION NO. : 15/256296
DATED : February 2, 2021
INVENTOR(S) : Trulson et al.

Page 1 of 1

It is certified that error appears in the above-identified patent and that said Letters Patent is hereby corrected as shown below:

In the Claims

Column 27, Line 32, Claim 12:
Replace "direction" with --directing--

Column 27, Line 33, Claim 12:
Replace "direction" with --directing--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*